(12) United States Patent
Imamura et al.

(10) Patent No.: US 8,131,787 B2
(45) Date of Patent: Mar. 6, 2012

(54) INFORMATION, TRANSFORMATION AND REVERSE TRANSFORMATION PROCESSING

(75) Inventors: Takeshi Imamura, Yokohama (JP); Kent Tamura, Machida (JP); Satoshi Makino, Yamato (JP); Toshiro Takase, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 685 days.

(21) Appl. No.: 12/123,991

(22) Filed: May 20, 2008

(65) Prior Publication Data
US 2008/0313203 A1 Dec. 18, 2008

(51) Int. Cl.
G06F 7/00 (2006.01)
G06F 17/30 (2006.01)
(52) U.S. Cl. ............ 707/999.101; 707/100; 707/101; 707/687; 707/694; 707/736; 715/205; 715/209; 715/234; 715/235; 715/236; 715/237; 715/239; 714/798; 713/100; 713/187
(58) Field of Classification Search ............ 707/999.1
See application file for complete search history.

(56) References Cited

U.S. PATENT DOCUMENTS

| | | | | |
|---|---|---|---|---|
| 6,088,717 | A * | 7/2000 | Reed et al. | 709/201 |
| 6,694,433 | B1 * | 2/2004 | Kolouch | 705/36 R |
| 6,829,614 | B2 * | 12/2004 | Fujishima et al. | 707/756 |
| 6,857,070 | B1 * | 2/2005 | Fukuda | 713/153 |
| 6,931,532 | B1 * | 8/2005 | Davis et al. | 713/167 |
| 7,281,205 | B2 * | 10/2007 | Brook | 715/237 |
| 2001/0000265 | A1 * | 4/2001 | Schreiber et al. | 713/201 |
| 2004/0128535 | A1 * | 7/2004 | Cheng | 713/201 |

OTHER PUBLICATIONS

Takase, T., et el, 'XML Digital Signature System Independent of Existing Applications', 2002, Proceedings of the 2002 Symposium on Applications and the Internet, IEEE, entire document, http://www.cin.ufpe.br/~emb/artigos/00994565.pdf.*

* cited by examiner

*Primary Examiner* — Edan Orgad
*Assistant Examiner* — Ronald Baum
(74) *Attorney, Agent, or Firm* — Shimokaji & Assoc., P.C.

(57) ABSTRACT

A transformation processing system input data including a data record area for storing target date and a transformation processing identification information record area for storing transformation processing identification information about transformation processing executed upon the target data. The transformation processing system includes: a reverse transformation information recording unit which records a target data pointer indicating the data record area in transformed data, a transformation processing identification information pointer indicating the transformation processing identification information record area, and reverse transformation processing identification information about reverse transformation processing; a target data transformation unit which transforms the target data and records it in the data record area; and a transformation processing identification information recording unit which adds the transformation processing identification information about the transformation processing executed by the target data transformation unit to the transformation processing identification information record area in the input data.

15 Claims, 12 Drawing Sheets

FIG.2

```
 1: MIME-Version: 1.0                                                           40
 2: Content-Type: Multipart/Related; boundary=MIME_boundary; type=text/xml;
 3:    start="<claim061400a.xml@claiming-it.com>"
 4:
 5: --MIME_boundary
 6: Content-Type: text/xml; charset=UTF-8
 7: Content-Transfer-Encoding: 8bit
 8: Content-ID: <claim061400a.xml@claiming-it.com>
 9:
10: <?xml version='1.0'?>
11: <SOAP-ENV:Envelope
12:    xmlns:SOAP-ENV="http://schemas.xmlsoap.org/soap/envelope/"
13:    xmlns:wsse="http://schemas.xmlsoap.org/ws/2002/06/secext"
14:    xmlns:wsu="http://schemas.xmlsoap.org/ws/2002/06/utility"
15:    xmlns:ds="http://www.w3.org/2000/09/xmldsig#"
16:    xmlns:enc="http://www.w3.org/2001/04/xmlenc#"
17:    xmlns:dcrpt="http://www.w3.org/2002/07/decrypt#"
18:    xmlns:eis="http://.../eiselect">                                          400
19:    <SOAP-ENV:Header wsu:Id="h">
20:       <wsse:Security>                                                        470
21:          <ds:Signature>
22:             ...                                                           440  460
23:             <ds:Reference URI="#h">           430        444
24:                <ds:Transforms>
25:                   <ds:Transform Algorithm="http://.../eiselect"/>           450
26:                   <eis:Reference URI="cid:claim061400a.tiff@claiming-it.com"/>
27:                </ds:Transform>
28:                <ds:Transform Algorithm="http://www.w3.org/2002/07/decrypt#Binary"/>
29:                </ds:Transforms>
30:                ...                                                       464
31:             </ds:Reference>
32:             ...
33:          </ds:Signature>
34:       </wsse:Security>
35:       <wsse:Security>                                                      420
36:          <enc:EncryptedData MimeType="image/tiff">
37:             ...
38:             <enc:CipherReference URI="cid:claim061400a.tiff@claiming-it.com"/>
39:             ...
40:          </enc:EncryptedData>
41:       </wsse:Security>                                                      425
42:    </SOAP-ENV:Header>
43:    <SOAP-ENV:Body>
44:       ...
45:    </SOAP-ENV:Body>
46: </SOAP-ENV:Envelope>                                                        410
47:
48: --MIME_boundary
49: Content-Type: application/octet-stream
50: Content-Transfer-Encoding: base64
51: Content-ID: <claim061400a.tiff@claiming-it.com>                             415
52:
53: ydUNqHkM...
54:
55: --MIME_boundary--
```

FIG.3

```
19 : <SOAP-ENV:Header wsu:Id="h">                                          400
20 :   <wsse:Security>
21 :     <ds:Signature>
22 : 432  ...
23 :       <ds:Reference URI="#h">      430    444         440
24 :     442  <ds:Transforms>                                          450
25 :         <ds:Transform Algorithm="http://.../eiselect"/>
26 :     452   <eis:Reference URI="cid:claim061400a.tiff@claiming-it.com"/>   460
27 :         </ds:Transform>
28 :     462  <ds:Transform Algorithm="http://www.w3.org/2002/07/decrypt#Binary"/>
29 :       </ds:Transforms>                                      464
30 :       ...
31 :     </ds:Reference>
32 :     ...
33 :   </ds:Signature>
34 :   </wsse:Security>
35 :   <wsse:Security>                                     420
36 :     <enc:EncryptedData MimeType="image/tiff">
37 :       ...
38 :     <enc:CipherReference URI="cid:claim061400a.tiff@claiming-it.com"/>
39 :       ...                                             425
40 :     </enc:EncryptedData>
41 :   </wsse:Security>
42 : </SOAP-ENV:Header>
```

FIG.4

```
                                                          420
36 : <enc:EncryptedData MimeType="image/tiff">
37 :   ...
38 :   <enc:CipherReference URI="cid:claim061400a.tiff@claiming-it.com"/>
39 :   ...
40 : </enc:EncryptedData>                          425
```

FIG.5

```
 1: MIME-Version: 1.0                                                              40
 2: Content-Type: Multipart/Related; boundary=MIME_boundary; type=text/xml;
 3:    start="<claim061400a.xml@claiming-it.com>"
 4:
 5: --MIME_boundary
 6: Content-Type: text/xml; charset=UTF-8
 7: Content-Transfer-Encoding: 8bit
 8: Content-ID: <claim061400a.xml@claiming-it.com>
 9:
10: <?xml version='1.0'?>
11: <SOAP-ENV:Envelope
12:    xmlns:SOAP-ENV="http://schemas.xmlsoap.org/soap/envelope/"
13:    xmlns:wsse="http://schemas.xmlsoap.org/ws/2002/06/secext"
14:    xmlns:wsu="http://schemas.xmlsoap.org/ws/2002/06/utility"
15:    xmlns:ds="http://www.w3.org/2000/09/xmldsig#"
16:    xmlns:enc="http://www.w3.org/2001/04/xmlenc#"
17:    xmlns:dcrpt="http://www.w3.org/2002/07/decrypt#"
18:    xmlns:eis="http://.../eiselect">                                    500
19:    <SOAP-ENV:Header wsu:Id="h">
20:       <wsse:Security>                                                  580
21:          <ds:Signature>                                             540 570
22:    532  ...
23:             <ds:Reference URI="#h">          530         544
24:    542       <ds:Transforms>                                           550
25:                 <ds:Transform Algorithm="http://.../eiselect">
26:    552             <eis:Reference URI="cid:claim061400a.tiff@claiming-it.com"/>
27:                    <eis:Except URI="#ed"/>          560
28:              </ds:Transform>
29:    572       <ds:Transform Algorithm="http://www.w3.org/2002/07/decrypt#Binary"/>
30:              </ds:Transforms>                  574
31:             ...
32:           </ds:Reference>
33:           ...
34:          </ds:Signature>
35:       </wsse:Security>
36:       <wsse:Security>                                    520
37:          <enc:EncryptedData Id="ed" MimeType="image/tiff">
38:             ...                                                    525
39:             <enc:CipherReference URI="cid:claim061400a.tiff@claiming-it.com"/>
40:             ...
41:          </enc:EncryptedData>
42:       </wsse:Security>
43:    </SOAP-ENV:Header>
44:    <SOAP-ENV:Body>
45:       ...
46:    </SOAP-ENV:Body>
47: </SOAP-ENV:Envelope>
48:                                                                       510
49: --MIME_boundary
50: Content-Type: application/octet-stream
51: Content-Transfer-Encoding: base64              515
52: Content-ID: <claim061400a.tiff@claiming-it.com>
53:
54: ydUNqHkM...
55:
56: --MIME_boundary--
```

FIG. 6

```
1 : <enc:EncryptedData>
2 :    <enc:EncryptionMethod Algorithm="http://.../null"/>
3 :    ...
4 :    <enc:CipherReference URI="cid:claim061400a.tiff@claiming-it.com"/>
5 :    ...
6 : </enc:EncryptedData>
```

FIG. 7

```
 1: MIME-Version: 1.0                                                          40
 2: Content-Type: Multipart/Related; boundary=MIME_boundary; type=text/xml;
 3:    start="<claim061400a.xml@claiming-it.com>"
 4:
 5: --MIME_boundary
 6: Content-Type: text/xml; charset=UTF-8
 7: Content-Transfer-Encoding: 8bit
 8: Content-ID: <claim061400a.xml@claiming-it.com>
 9:
10: <?xml version='1.0'?>
11: <SOAP-ENV:Envelope
12:    xmlns:SOAP-ENV="http://schemas.xmlsoap.org/soap/envelope/"
13:    xmlns:wsse="http://schemas.xmlsoap.org/ws/2002/06/secext"
14:    xmlns:wsu="http://schemas.xmlsoap.org/ws/2002/05/utility"
15:    xmlns:ds="http://www.w3.org/2000/09/xmldsig#"
16:    xmlns:enc="http://www.w3.org/2001/04/xmlenc#"
17:    xmlns:dcrpt="http://www.w3.org/2002/07/decrypt#"
18:    xmlns:eis="http://.../eiselect">                                    600
19:    <SOAP-ENV:Header wsu:Id="h">
20:      <wsse:Security>                                              670
21:        <enc:EncryptedData Id="ed1" MimeType="image/tiff">
22:   632    ...                                                  640  660
23:          <enc:CipherReference URI="#h">  630
24:   642      <enc:Transforms>                                          650
25:              <ds:Transform Algorithm="http://.../eiselect">
26:   652          <eis:Reference URI="cid:claim061400a.tiff@claiming-it.com"/>
27:              </ds:Transform>
28:   662      <ds:Transform Algorithm="http://www.w3.org/2002/07/decrypt#Binary"/>
29:            </enc:Transforms>                                664
30:          </enc:CipherReference>
31:          ...
32:        </enc:EncryptedData>
33:      </wsse:Security>
34:      <wsse:Security>                                           620
35:        <enc:EncryptedData Id="ed2" MimeType="application/octet-stream">
36:          ...
37:          <enc:CipherReference URI="cid:claim061400a.tiff@claiming-it.com"/>
38:          ...                                                  625
39:        </enc:EncryptedData>
40:      </wsse:Security>
41:    </SOAP-ENV:Header>
42:    <SOAP-ENV:Body>
43:      ...
44:    </SOAP-ENV:Body>
45: </SOAP-ENV:Envelope>                                              610
46:
47: --MIME_boundary
48: Content-Type: application/octet-stream
49: Content-Transfer-Encoding: base64
50: Content-ID: <claim061400a.tiff@claiming-it.com>  615
51:
52: ydUNqHkM...
53:
54: --MIME_boundary--
```

FIG. 8

```
 1 : MIME-Version: 1.0                                                          40
 2 : Content-Type: Multipart/Related; boundary=MIME_boundary; type=text/xml;
 3 :    start="<claim061400a.xml@claiming-it.com>"
 4 :
 5 : --MIME_boundary
 6 : Content-Type: text/xml; charset=UTF-8
 7 : Content-Transfer-Encoding: 8bit
 8 : Content-ID: <claim061400a.xml@claiming-it.com>
 9 :
10 : <?xml version='1.0'?>
11 : <SOAP-ENV:Envelope
12 :    xmlns:SOAP-ENV="http://schemas.xmlsoap.org/soap/envelope/"
13 :    xmlns:wsse="http://schemas.xmlsoap.org/ws/2002/06/secext"
14 :    xmlns:wsu="http://schemas.xmlsoap.org/ws/2002/06/utility"
15 :    xmlns:ds="http://www.w3.org/2000/09/xmldsig#"
16 :    xmlns:enc="http://www.w3.org/2001/04/xmlenc#"
17 :    xmlns:dcrpt2="http://.../decrypt2">                                      700
18 :    <SOAP-ENV:Header wsu:Id="h">
19 :       <wsse:Security>
20 :          <ds:Signature>
21 :   732 ...
22 :             <ds:Reference URI="cid:claim061400a.tiff@claiming-it.com">      730
23 :   742        <ds:Transforms>
24 :                 <ds:Transform Algorithm="http://.../decrypt2"/>             740
25 :   752             <dcrpt2:Reference URI="#h"/>
26 :                </ds:Transform>                                              744
27 :             </ds:Transforms>                750
28 :             ...
29 :             </ds:Reference>
30 :             ...
31 :          </ds:Signature>
32 :       </wsse:Security>
33 :       <wsse:Security>                                                       720
34 :          <enc:EncryptedData MimeType="image/tiff">
35 :             ...
36 :             <enc:CipherReference URI="cid:claim061400a.tiff@claiming-it.com"/>
37 :             ...                                                             725
38 :          </enc:EncryptedData>
39 :       </wsse:Security>
40 :    </SOAP-ENV:Header>
41 :    <SOAP-ENV:Body>
42 :       ...
43 :    </SOAP-ENV:Body>
44 : </SOAP-ENV:Envelope>
45 :                                                                             710
46 : --MIME_boundary
47 : Content-Type: application/octet-stream
48 : Content-Transfer-Encoding: base64                    715
49 : Content-ID: <claim061400a.tiff@claiming-it.com>
50 :
51 : ydUNqHkM...
52 :
53 : --MIME_boundary--
```

FIG. 9

```
18 : <SOAP-ENV:Header wsu:Id="h">                                    700
19 :   <wsse:Security>
20 :     <ds:Signature>
21 :   732 ...
22 :       <ds:Reference URI="cid:claim061400a.tiff@claiming-it.com">   730
23 :   742   <ds:Transforms>
24 :           <ds:Transform Algorithm="http://.../decrypt2"/>
25 :   752      <dcrpt2:Reference URI="#h"/>                  740
26 :           </ds:Transform>                        744
27 :         </ds:Transforms>          750
28 :         ...
29 :       </ds:Reference>
30 :       ...
31 :     </ds:Signature>
32 :   </wsse:Security>
33 :   <wsse:Security>                                          720
34 :     <enc:EncryptedData MimeType="image/tiff">
35 :       ...
36 :       <enc:CipherReference URI="cid:claim061400a.tiff@claiming-it.com"/>
37 :       ...                                                725
38 :     </enc:EncryptedData>
39 :   </wsse:Security>
40 : </SOAP-ENV:Header>
```

FIG. 10

```
                                                              720
34 : <enc:EncryptedData MimeType="image/tiff">
35 :   ...
36 :   <enc:CipherReference URI="cid:claim061400a.tiff@claiming-it.com"/>
37 :   ...
38 : </enc:EncryptedData>                              725
```

FIG. 13

```
 1: MIME-Version: 1.0
 2: Content-Type: Multipart/Related; boundary=MIME_boundary; type=text/xml;
 3:    start="<claim061400a.xml@claiming-it.com>"
 4:
 5: --MIME_boundary
 6: Content-Type: text/xml; charset=UTF-8
 7: Content-Transfer-Encoding: 8bit
 8: Content-ID: <claim061400a.xml@claiming-it.com>
 9:
10: <?xml version='1.0'?>
11: <SOAP-ENV:Envelope
12:    xmlns:SOAP-ENV="http://schemas.xmlsoap.org/soap/envelope/"
13:    xmlns:wsse="http://schemas.xmlsoap.org/ws/2002/06/secext"
14:    xmlns:wsu="http://schemas.xmlsoap.org/ws/2002/06/utility"
15:    xmlns:ds="http://www.w3.org/2000/09/xmldsig#"
16:    xmlns:enc="http://www.w3.org/2001/04/xmlenc#"
17:    xmlns:dcrpt="http://www.w3.org/2002/07/decrypt#"
18:    xmlns:eis="http://.../eiselect">
19:    <SOAP-ENV:Header>
20:       <wsse:Security>
21:          <ds:Signature>
22:             ...
23:             <ds:Reference URI="cid:foo.xml@claiming-it.com">
24:                <ds:Transforms>
25:                   <ds:Transform Algorithm="http://www.w3.org/2002/07/decrypt#XML"/>
26:                </ds:Transforms>
27:                ...
28:             </ds:Reference>
29:             ...
30:          </ds:Signature>
31:       </wsse:Security>
32:    </SOAP-ENV:Header>
33:    <SOAP-ENV:Body>
34:       ...
35:    </SOAP-ENV:Body>
36: </SOAP-ENV:Envelope>
37:
38: --MIME_boundary
39: Content-Type: text/xml; charset=UTF-8
40: Content-Transfer-Encoding: 8bit
41: Content-ID: <foo.xml@claiming-it.com>
42:
43: <?xml version='1.0'?>
44: <foo>
45:    <bar>...</bar>
46: </foo>
47:
48: --MIME_boundary--
```

FIG. 14

```
 1: MIME-Version: 1.0
 2: Content-Type: Multipart/Related; boundary=MIME_boundary; type=text/xml;
 3:    start="<claim061400a.xml@claiming-it.com>"
 4:
 5: --MIME_boundary
 6: Content-Type: text/xml; charset=UTF-8
 7: Content-Transfer-Encoding: 8bit
 8: Content-ID: <claim061400a.xml@claiming-it.com>
 9:
10: <?xml version='1.0'?>
11: <SOAP-ENV:Envelope
12:    xmlns:SOAP-ENV="http://schemas.xmlsoap.org/soap/envelope/"
13:    xmlns:wsse="http://schemas.xmlsoap.org/ws/2002/06/secext"
14:    xmlns:wsu="http://schemas.xmlsoap.org/ws/2002/06/utility"
15:    xmlns:ds="http://www.w3.org/2000/09/xmldsig#"
16:    xmlns:enc="http://www.w3.org/2001/04/xmlenc#"
17:    xmlns:dcrpt="http://www.w3.org/2002/07/decrypt#"
18:    xmlns:eis="http://.../eiselect">
19:    <SOAP-ENV:Header>
20:       <wsse:Security>
21:          <ds:Signature>
22:             ...
23:             <ds:Reference URI="cid:foo.xml@claiming-it.com">
24:                <ds:Transforms>
25:                   <ds:Transform Algorithm="http://www.w3.org/2002/07/decrypt#XML"/>
26:                </ds:Transforms>
27:                ...
28:             </ds:Reference>
29:             ...
30:          </ds:Signature>
31:       </wsse:Security>
32:       <wsse:Security>
33:          <enc:EncryptedData MimeType="text/xml">
34:             ...
35:             <enc:CipherReference URI="cid:foo.xml@claiming-it.com"/>
36:             ...
37:          </enc:EncryptedData>
38:       </wsse:Security>
39:    </SOAP-ENV:Header>
40:    <SOAP-ENV:Body>
41:       ...
42:    </SOAP-ENV:Body>
43: </SOAP-ENV:Envelope>
44:
45: --MIME_boundary
46: Content-Type: application/octet-stream
47: Content-Transfer-Encoding: base64
48: Content-ID: <foo.xml@claiming-it.com>
49:
50: ydUNqHkM...
51:
52: --MIME_boundary--
```

INFORMATION, TRANSFORMATION AND REVERSE TRANSFORMATION PROCESSING

FIELD OF THE INVENTION

The present invention relates to an information processing system, a transformation processing system, a reverse transformation processing system, a transformation method, a transformation program, and a recording medium. The present invention particularly relates to an information processing system which creates a digital signature for input data or encrypts input data, and to a transformation processing system, a reverse transformation processing system, a transformation method, a transformation program, and a recording medium concerning the information processing system.

BACKGROUND OF THE INVENTION

In recent years, the Extensible Markup Language (XML) has come into wide use as a language which describes compatible data in a structured manner.

The following documents are considered:
(Non-Patent Document 1) D. Eastlake, J. Reagle, and D. Solo. 'XML-Signature Syntax and Processing'. W3C Recommendation [online], 2002 [retrieved on 2003 Dec. 26]. Retrieved from the Internet: <URL: http://www.w3.org/TR/xmldsig-core>.
(Non-Patent Document 2) D. Eastlake and J. Reagle. 'XML Encryption Syntax and Processing'. W3C Recommendation [online], 2002 [retrieved on 2003 Dec. 26]. Retrieved from the Internet: <URL: http://www.w3.org/TR/xmlenc-core>.
(Non-Patent Document 3) M. Hughes, T. Imamura, and H. Maruyama. 'Decryption Transform for XML Signature'. W3C Recommendation [online], 2002 [retrieved on 2003 Dec. 26]. Retrieved from the Internet: <URL: http://www.w3.org/TR/xmlenc-decrypt>.
(Non-Patent Document 4) J. Barton, S. Thatte, and H. Nielsen. 'SOAP Messages with Attachments'. W3C Note [online], 2000 [retrieved on 2003 Dec. 26]. Retrieved from the Internet: <URL: http://www.w3.org/TR/SOAP-attachments>.

Technologies have been proposed to create a digital signature for data described in the XML (see Non-Patent Document 1), and a technology to encrypt data described in the XML (see Non-Patent Document 2).

For example, according to the technology in Non-Patent Document 1, a device on the digital signature verifying side can receive an input of information in which target data for digital signing and information concerning the digital signing (e.g., signature algorithm, value of a signature, key used for verification or the like of the signature, or the like) are combined as a single piece of data. The device can also receive an input of information in which the target data for digital signing and the information concerning the digital signing are separately provided. For example, the device can receive an input of information in which the target data for digital signing and the information concerning the digital signing are recorded on different Multipurpose Internet Mail Extension (MIME) parts. In this case, the information concerning the digital signing may have a pointer to the target data for digital signing, and may include information for designating the procedure for digital signature verification.

According to the technology in Non-Patent Document 2, a device which decrypts encrypted data can receive an input of information in which target data for encryption and information concerning the encryption (e.g., encryption algorithm, key used for decryption, or the like) are combined as a single piece of data. The device can also receive an input of information in which the target data for encryption and the information concerning the encryption are separately provided. In this case, the information concerning the encryption may have a pointer to the target data for encryption, and may include information for designating the procedure for decryption.

With the recent spread of computer networks and the like, not only information which has gone through processing of digital signing or encryption for only once, but also information which has gone through processing of digital signing or encryption for several times has been increasingly used. In this case, generally, all the digital signatures can be verified and the plaintext can be obtained only when digital signature verification, or decryption, is performed in reverse order to the processings performed when the plaintext was digitally singed or encrypted. Therefore, it is necessary for a sender of information or the like to correctly inform a receiver of the information or the like about the processing order in digital signing or encryption.

Hitherto, there has been proposed a method of properly managing the processing order in digital signing or encryption, as described in Non-Patent Document 3 for example. According to this technology, every time a device on the sending side executes processing of digital signing or encryption, the device records identification information on other processing of digital signing or encryption which has been already executed at the point when the digital signing or encryption in question is executed, while associating the identification information with information concerning the digital signing or encryption in question. Prior to executing digital signature verification or decryption, a device on the receiving side, among all the digital signatures or encrypted data created for target information, verifies the digital signatures or decrypts the encrypted data excluding a digital signature or encrypted data created by the processing indicated by the identification information recorded in association with the information concerning the digital signing or the like in question.

Non-Patent Document 4 will be described later. However, according to the technology in Non-Patent Document 3, the device on the receiving side requires, as input information, information for identifying processing of digital signing or encryption (hereinafter, referred to as encryption information). Accordingly, when the encryption information and the encryption target information are separately provided, the device cannot receive, as an input, only the encryption target information without receiving the encryption information. This will be described in more detail below.

FIG. 13 shows an example in which a digital signature has been created for attachment data. Specifically, the attachment data shown on the 38th to 48th lines are described in conformity with the SOAP attachment stated in Non-Patent Document 4. Moreover, the data shown on the 21st to 30th lines indicate information concerning the digital signature. More specifically, the text on the 23rd line indicates that target information for digital signing is the attachment data on the 38th to 48th lines. The text on the 25th line indicates a program for decrypting encrypted data based on the encryption information included in the target information for digital signing, prior to the verification of the digital signature. This program is, for example, a program for implementing the device on the receiving side according to the technology in Non-Patent Document 3.

FIG. 14 shows an example in which attachment data has been encrypted. The text on the 33rd to 37th lines indicates encryption information. The text on the 50th line indicates the attachment data encrypted. Here, the attachment data in FIG. 14 is encrypted after a digital signature for this attachment data has been created. Accordingly, it is necessary to decrypt the attachment data prior to the verification of the digital signature. However, a program designated by the text on the 25th line refers to the target information for encryption shown on the 45th to 52nd lines because an ID designated by the text on the 23rd line coincides with an ID on the 48th line. Therefore, the encryption information shown on the 33rd to 37th lines cannot be detected properly. As described above, conventionally, when encryption target information and encryption information are separately provided, proper decryption of encrypted data or proper verification of a digital signature cannot be executed.

SUMMARY OF THE INVENTION

In order to solve the above-mentioned problem, an aspect of the present invention is the provision of an information processing system. The system includes a transformation processing system which transforms input data to transformed data, and a reverse transformation processing system which reversely transforms the transformed data to the input data, wherein the input data includes a data record area for storing target data to be transformed, and a transformation processing identification information record area for storing transformation processing identification information for identifying transformation processing executed upon the target data.

In some embodiments, the transformation processing system has: a reverse transformation information recording unit which records into the transformed data a target data pointer, a transformation processing identification information pointer, and reverse transformation processing identification information in association with one another, the target data pointer indicating a position of the data record area in the transformed data, the transformation processing identification information pointer indicating a position of the transformation processing identification information record area, and the reverse transformation processing identification information identifying reverse transformation processing for executing reverse transformation corresponding to transformation processing to be executed upon the input data; a target data transformation unit which, as the transformation processing, transforms the target data in the input data and records the transformed target data into the data record area in the transformed data; and a transformation processing identification information recording unit which adds the transformation processing identification information for identifying the transformation processing executed by the target data transformation unit to the transformation processing identification information record area in the input data, and thus records the transformation processing identification information into the transformation processing identification information record area in the transformed data.

The reverse transformation processing system has: a pointer acquisition unit which acquires the target data pointer and the transformation processing identification information pointer in association with the reverse transformation processing identification information; a transformation processing identification information acquisition unit which acquires the transformation processing identification information from the transformation processing identification information record area designated by the transformation processing identification information pointer acquired by the pointer acquisition unit; and a reverse transformation unit which reversely transforms the transformed target data, which has been transformed through the transformation processing and is recorded in the target data record area designated by the target data pointer acquired by the pointer acquisition unit, into the target data through the reverse transformation processing designated by the reverse transformation processing identification information, based on the transformation processing identification information acquired by the transformation processing identification information acquisition unit. A transformation processing system, a reverse transformation processing system, a transformation method, a transformation program, and a recording medium are also provided.

Note that the foregoing summary of the invention does not list all necessary features of the present invention, and sub-combinations of groups of these features can also be incorporated in the invention.

According to the present invention, encrypted data can be properly decrypted even when information on a target for encryption or the like and information indicative of processing of the encryption are separately provided.

BRIEF DESCRIPTION OF THE DRAWINGS

For a more complete understanding of the present invention and the advantage thereof, reference is now made to the following description taken in conjunction with the accompanying drawings, in which:

FIG. 2 shows a first example of transformed data 40;

FIG. 3 shows a transformation processing identification information record area 400 to be selected by a reverse transformation unit 320 and inputted to an extraction program 444;

FIG. 4 shows transformation processing identification information 420 extracted by the reverse transformation unit 320;

FIG. 5 shows a second example of the transformed data 40;

FIG. 6 shows an example of information for identifying null-transformation, created by the reverse transformation unit 320;

FIG. 7 shows a third example of the transformed data 40;

FIG. 8 shows a fourth example of the transformed data 40;

FIG. 9 shows a transformation processing identification information record area 700 selected by the reverse transformation unit 320;

FIG. 10 shows transformation processing identification information 720 extracted by the reverse transformation unit 320;

FIG. 13 shows an example in which a digital signature is created for attachment data; and FIG. 14 shows an example in which attachment data is encrypted.

DETAILED DESCRIPTION OF THE INVENTION

Figure 1:
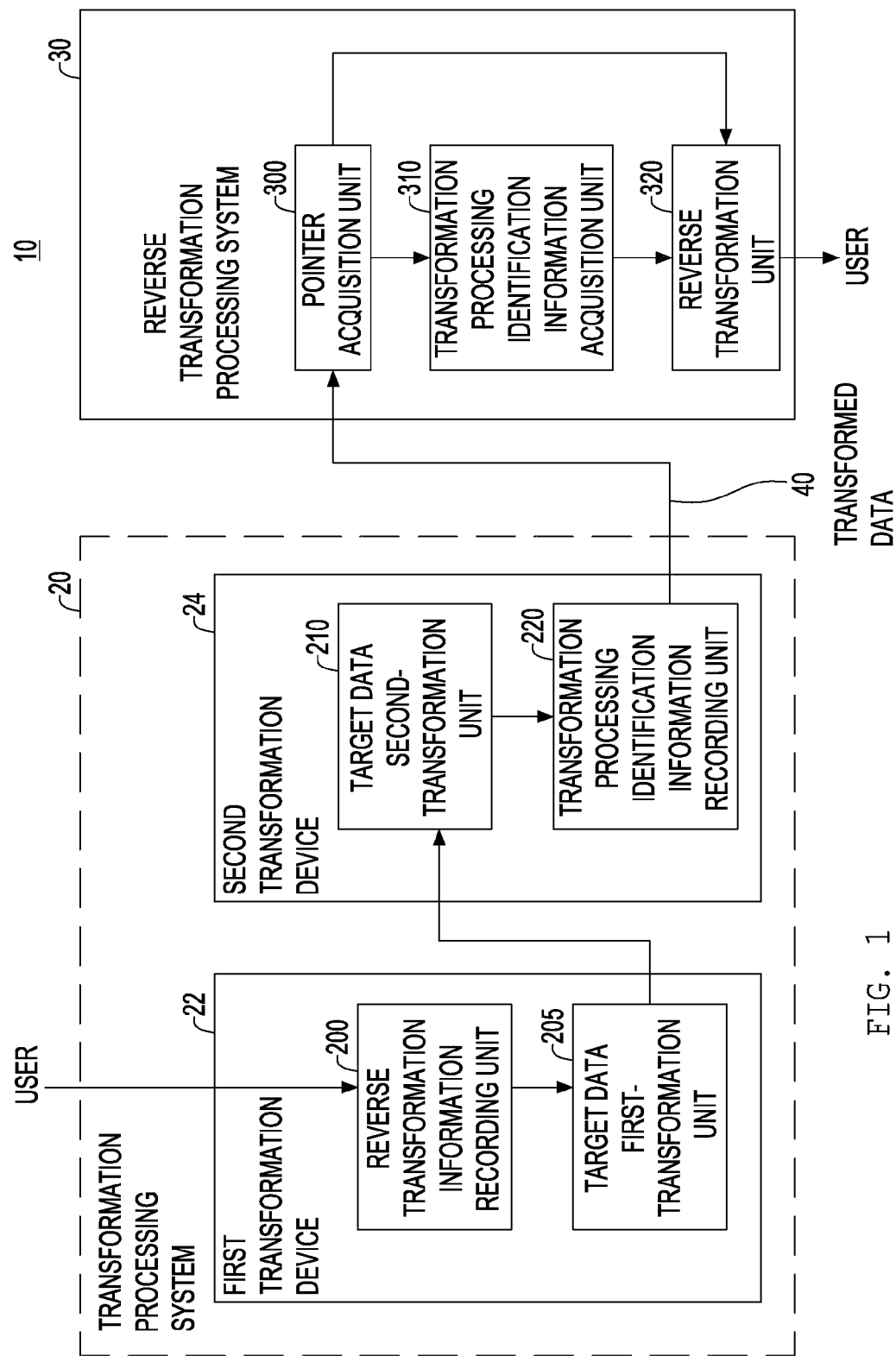
FIG. 1 is a block diagram of an information processing system 10.

The present invention provides an information processing system, a transformation processing system, a reverse transformation processing system, a transformation method, a transformation program, and a recording medium which are capable of executing proper decryption of encrypted data or proper verification of a digital signature, when encryption target information and encryption information are separately provided.

In a first embodiment, the present invention provides an information processing system including a transformation processing system which transforms input data to transformed data, and a reverse transformation processing system which reversely transforms the transformed data to the input data, wherein the input data includes a data record area for storing target data to be transformed, and a transformation processing identification information record area for storing transformation processing identification information for identifying transformation processing executed upon the target data.

In an example embodiment, a transformation processing system has: a reverse transformation information recording unit which records into the transformed data a target data pointer, a transformation processing identification information pointer, and reverse transformation processing identification information in association with one another, the target data pointer indicating a position of the data record area in the transformed data, the transformation processing identification information pointer indicating a position of the transformation processing identification information record area, and the reverse transformation processing identification information identifying reverse transformation processing for executing reverse transformation corresponding to transformation processing to be executed upon the input data; a target data transformation unit which, as the transformation processing, transforms the target data in the input data and records the transformed target data into the data record area in the transformed data; and a transformation processing identification information recording unit which adds the transformation processing identification information for identifying the transformation processing executed by the target data transformation unit to the transformation processing identification information record area in the input data, and thus records the transformation processing identification information into the transformation processing identification information record area in the transformed data.

In an example embodiment, a reverse transformation processing system has: a pointer acquisition unit which acquires the target data pointer and the transformation processing identification information pointer in association with the reverse transformation processing identification information; a transformation processing identification information acquisition unit which acquires the transformation processing identification information from the transformation processing identification information record area designated by the transformation processing identification information pointer acquired by the pointer acquisition unit; and a reverse transformation unit which reversely transforms the transformed target data, which has been transformed through the transformation processing and is recorded in the target data record area designated by the target data pointer acquired by the pointer acquisition unit, into the target data through the reverse transformation processing designated by the reverse transformation processing identification information, based on the transformation processing identification information acquired by the transformation processing identification information acquisition unit.

In example embodiments, a transformation processing system, a reverse transformation processing system, a transformation method, a transformation program, and a recording medium are also provided. Sub combinations of groups of these features are also incorporated in this invention. Thus, according to the present invention, encrypted data can be properly decrypted even when information on a target for encryption or the like and information indicative of processing of the encryption are separately provided.

Hereinafter, the present invention will be described through an embodiment. However, the following embodiment is not intended to limit the present invention according to the scope of claims, and all combinations of the features described in the embodiment are not necessarily essential to the solving means of the present invention.

FIG. 1 is a block diagram of an information processing system 10. The information processing system 10 includes a transformation processing system 20 which transforms input data to transformed data 40, and a reverse transformation processing system 30 which reversely transforms the transformed data 40 to the input data. The transformation processing system 20 has a first transformation device 22 and a second transformation device 24 connected to the first transformation device 22 via a network or the like. An object of the information processing system 10 is to properly verify a digital signature after, by the reverse transformation processing system 30, decrypting the transformed data 40 which has been processed for encryption or digital signing sequentially by the first and second transformation devices 22 and 24.

First, as a premise of the following description, the input data to be inputted to the transformation processing system 20 includes a data record area for storing target data to be transformed, and a transformation processing identification information record area for storing transformation processing identification information for identifying transformation processing executed upon the target data. Hereinafter, a description will be given of processing of creating the transformed data 40 based on the input data by the transformation processing system 20.

The first transformation device 22 has a reverse transformation information recording unit 200 and a target data first-transformation unit 205. Upon receiving input data from a user, the reverse transformation information recording unit 200, prior to processing of creating a digital signature, records a target data pointer for indicating the position of the data record area in the transformed data 40 and a transformation processing identification information pointer for indicating the position of the transformation processing identification information record area, in the transformation processing identification information record area in the transformation data 40 while associating the pointers with each other. The reverse transformation information recording unit 200 then records reverse transformation processing identification information for identifying reverse transformation processing for executing reverse transformation corresponding to transformation processing to be executed upon the input data after a digital signature is created, in the transformation processing identification information record area in the transformed data 40 while further associating the reverse transformation processing identification information with the pointers.

The target data first-transformation unit 205 then creates a digital signature for target data in the input data and for the information recorded in the transformation processing identification information record area by the reverse transformation information recording unit 200, and records information for identifying this digital signature creating processing in the transformation processing identification information record area in the transformed data 40. Subsequently, the target data first-transformation unit 205 transmits the transformed data 40, as input data for the second transformation device 24, to the second transformation device 24.

The second transformation device 24 has a target data second-transformation unit 210, which is an example of a target data transformation unit according to the present invention, and a transformation processing identification information recording unit 220. As the transformation processing, the target data second-transformation unit 210 encrypts the target data in the input data and records it in the data record area in the transformed data 40. The transformation processing identification information recording unit 220 then adds transformation processing identification information for identifying the encryption processing executed by the target data second-transformation unit 210 to the transformation processing identification information record area in the input data, and thus records the transformation processing identification information in the transformation processing identification information record area in the transformed data 40. The transformation processing identification information recording unit 220 sends the transformed data 40 thus created by the above-described processings to the reverse transformation processing system 30 via a network or the like.

In this embodiment, the transformation processing is, for example, processing of encryption. In this case, the reverse transformation processing is processing of decrypting the encrypted data. Instead, the transformation processing may be processing of creating a digital signature and attaching it to target data for digital signing. In this case, the reverse transformation processing is processing of verifying the correctness of the digital signature, removing the digital signature part, and the like. As still another example, the transformation processing may be processing of compressing data. In this case, the reverse transformation processing is processing of expanding the compressed data.

The reverse transformation processing system 30 has a pointer acquisition unit 300, a transformation processing identification information acquisition unit 310 and a reverse transformation unit 320. The pointer acquisition unit 300 acquires the target data pointer and the transformation processing identification information pointer, each associated with the reverse transformation processing identification information. The transformation processing identification information acquisition unit 310 then acquires the transformation processing identification information from the transformation processing identification information record area designated by the transformation processing identification information pointer acquired by the pointer acquisition unit 300. This transformation processing identification information is information for identifying the encryption processing executed by the target data second-transformation unit 210.

The reverse transformation unit 320 then reversely transforms the encrypted target data, which has been encrypted by the encryption processing and is recorded in the data record area designated by the target data pointer acquired by the pointer acquisition unit 300, to the target data by the reverse transformation processing designated by the reverse transformation processing identification information, based on the transformation processing identification information acquired by the transformation processing identification information acquisition unit 310. Subsequently, the reverse transformation unit 320 verifies the correctness of the digital signature, based on the target data after reversely transformed, and outputs the data after reversely transformed to a user, in association with the verification result.

FIG. 2 shows a first example of the transformed data 40. The transformed data 40 includes a transformation processing identification information record area 400 for storing target data to be transformed and a data record area 410 for storing transformation processing identification information for identifying transformation processing executed upon the target data. Data in the transformation processing identification information record area 400 and the data record area 410 are tagged data, which are information associated with tag information for instructing how to use the information. For example, the data is data described in the XML. Using this example, a detailed description will be given of the processing of creating the transformed data 40 by the transformation system 20.

First in the first transformation device 22, upon receiving input data from a user, the reverse transformation information recording unit 200 creates a target data pointer for indicating the position of the data record area in the transformed data 40 and a transformation processing identification information pointer for indicating the position of the transformation processing identification information record area, prior to processing of creating a digital signature. The reverse transformation information recording unit 200 then further creates reverse transformation processing identification information for identifying reverse transformation processing for executing reverse transformation corresponding to transformation processing to be executed upon the target data after the creation of the digital signature. The reverse transformation information recording unit 200 records these created pointers and information in, for example, a temporary storage area for temporarily storing information.

The target data first-transformation unit 205 creates a digital signature based on the target data in the input data and on the pointers and information created by the reverse transformation information recording unit 200. The target data first-transformation unit 205 then creates an area for storing information associated with the digital signature, on the 21st to 33rd lines in the transformed data 40. The target data first-transformation unit 205 then records the pointers and information, recorded in the temporary storage area by the reverse transformation information recording unit 200, in the area for storing information associated with the digital signature in the transformation processing identification information record area 400.

Through the above processing, the reverse transformation information recording unit 200 can resultantly record a transformation processing identification information pointer 430 for indicating the start position of the transformation processing identification information record area 400 in the transformed data 40, in the transformation processing identification information record area 400 while associating the transformation processing identification information pointer 430 with a reference tag 432 for indicating the referent of a program. Moreover, the reverse transformation information recording unit 200 can records a target data pointer 450 for indicating the position of the data record area 410 in the transformed data 40, in the transformation processing identification information record area 400 while associating the target data pointer 450 with a reference tag 452.

Here, the transformation processing identification information record area 400 is, for example, a header portion of an envelope section in SOAP data. Instead, the transformation processing identification information record area 400 may be the entire envelope section, or may be the entire transformed data 40. That is, it suffices that the transformation processing identification information pointer 430 indicates, as the transformation processing identification information record area 400, a predetermined area capable of storing the encryption information or information concerning digital signing.

Moreover, the reverse transformation information recording unit 200 can records extraction instruction information 440 and reverse transformation instruction information 460 as reverse transformation processing identification information 470. Here, the extraction instruction information 440 indicates an instruction to extract the transformation processing identification information from the transformation processing identification information record area 400 designated by the transformation processing identification information pointer 430, and to output the transformation processing identification information in association with the target data designated by the target data pointer 450. The reverse transformation instruction information 460 indicates information for instructing the execution of reverse transformation processing on the outputted target data, the reverse transformation processing corresponding to the transformation processing designated by the transformation processing identification information outputted in association with the target data.

Specifically, the extraction instruction information 440 is expressed as information in which information for indicating an extraction program 444 for executing extraction processing is associated with an execution instruction tag 442 for instructing the execution of a program. The reverse transformation instruction information 460 is expressed as information in which information for indicating a reverse transformation program 464 for executing reverse transformation processing is associated with an execution instruction tag 462.

The first transformation device 22 transmits the transformed data thus created to the second transformation device 24. Next, the second transformation device 24 will be described.

In the second transformation device 24, the target data second-transformation unit 210 encrypts the target data and records it on the 53rd line in the data record area 410. Here, the data record area 410 includes a target data ID 415 for allowing a program or the like to refer to the data record area 410. The transformation processing identification information recording unit 220 adds transformation processing identification information 420 for identifying the encryption processing executed by the target data second-transformation unit 210, to the transformation processing identification information record area in the input data, and thus records the transformation processing identification information 420 in the transformation processing identification information record area 400 in the transformed data 40. For example, the transformation processing identification information 420 includes information about a program for decrypting the target data, an encryption key or the like, and a target data pointer 425 for indicating the position where the target data is stored.

A description will be given of processing of verifying the digital signature generated by the target data first-transformation unit 205, with reference to FIGS. 3 and 4. The reverse transformation unit 320 selects the transformation processing identification information record area 400 designated by the transformation processing identification information pointer 430, and inputs the transformation processing identification information record area 400 in the extraction program 444. FIG. 3 shows the transformation processing identification information record area 400 to be selected and inputted in the extraction program 444 by the reverse transformation unit 320. The reverse transformation unit 320 then executes the extraction program 444, and thereby extracts the transformation processing identification information 420 from the transformation processing identification information record area 400. FIG. 4 shows the transformation processing identification information 420 extracted by the reverse transformation unit 320. The reverse transformation unit 320 then inputs the extracted transformation processing identification information 420 to the reverse transformation program 464, in association with the target data recorded in the data record area 410.

Upon doing this, the reverse transformation unit 320 executes the reverse transformation program 464, and thereby decrypts the inputted target data by decryption processing corresponding to encryption processing identified by the transformation processing identification information 420. The reverse transformation unit 320 then verifies the digital signature for the decrypted target data and outputs the verification result and the target data to a user. Here, the reverse transformation program 464 is a program for receiving a set of target data and transformation processing identification information as an input, and for reversely transforming the inputted target data by reverse transformation processing corresponding to the transformation processing designated by the inputted transformation processing identification information. As an example, the reverse transformation program 464 may be realized by the technology described in Non-Patent Document 3.

In addition, if a plurality of pieces of transformation processing identification information are extracted based on the extraction instruction information 440, the reverse transformation unit 320 selects, among these pieces of transformation processing identification information, transformation processing identification information for identifying the transformation processing first executed, and inputs the selected transformation processing identification information to the reverse transformation program 464. Consequently, the reverse transformation program for executing reverse transformation corresponding to the transformation processing is recursively called in sequence in the order in which the transformation processings were executed.

FIG. 5 shows a second example of the transformed data 40. The transformed data 40 includes a transformation processing identification information record area 500 and a data record area 510. Using this example, a description will be given of a second example of the processing of creating the transformed data 40 by the transformation processing system 20. As a premise of this example, the target data in input data has been encrypted already. Transformation processing identification information 520 is information for identifying this encryption. For example, the transformation processing identification information 520 includes information about a program for decrypting the target data, an encryption key or the like, and a target data pointer 525 for indicating the position where the target data is stored. The data record area 510 is the target data for this encryption and includes a target data ID 515 for allowing a program or the like to refer to the data record area 510.

In the first transformation device 22, upon receiving input data from a user, the reverse transformation information recording unit 200 creates a target data pointer for indicating the position of the data record area in the transformed data 40 and a transformation processing identification information pointer for indicating the position of the transformation processing identification information record area, prior to processing of creating a digital signature. The reverse transformation information recording unit 200 then further creates reverse transformation processing identification information for identifying reverse transformation processing for executing reverse transformation corresponding to transformation processing to be executed upon the target data after the creation of the digital signature. Moreover, the reverse transformation information recording unit 200 creates an exclusion instruction pointer for excluding decryption processing from the target for reverse transformation, the decryption processing corresponding to encryption processing that has been already executed upon the input data. The reverse transformation information recording unit 200 records these created pointers and information in, for example, a temporary storage area for temporarily storing information.

The target data first-transformation unit 205 then creates a digital signature based on the encrypted target data in the input data and on the pointers and information created by the reverse transformation information recording unit 200. The target data first-transformation unit 205 then creates an area for storing information associated with the digital signature, on the 21st to 34th lines in the transformed data 40. The target data first-transformation unit 205 then records the pointers and information, recorded in the temporary storage area by the reverse transformation information recording unit 200, in the area for storing information associated with the digital signature in the transformation processing identification information record area 400.

Through the above processing, the reverse transformation information recording unit 200 can resultantly record a transformation processing identification information pointer 530 for indicating the start position of the transformation processing identification information record area 500 in the transformed data 40, in the transformation processing identification information record area 500 while associating the transformation processing identification information pointer 530 with a reference tag 532 for indicating the referent of a program. Moreover, the reverse transformation information recording unit 200 can record a target data pointer 550 for indicating the data record area 510 in the transformed data 40, in the transformation processing identification information record area 500 while associating the target data pointer 550 with a reference tag 552. In addition, the reverse transformation information recording unit 200 can record extraction instruction information 540 and reverse transformation instruction information 570 as reverse transformation processing identification information 580.

Here, the extraction instruction information 540 indicates an instruction to extract the transformation processing identification information from the transformation processing identification information record area 500 designated by the transformation processing identification information pointer 530, and to output the transformation processing identification information in association with the target data designated by the target data pointer 550. The reverse transformation instruction information 570 indicates information for instructing the execution of reverse transformation processing on the outputted target data, the reverse transformation processing corresponding to the transformation processing designated by the transformation processing identification information outputted in association with the target data.

Specifically, the extraction instruction information 540 is expressed as information in which an extraction program 544 for executing extraction processing is associated with an execution instruction tag 542. Moreover, the reverse transformation instruction information 570 is expressed as information in which a reverse transformation program 574 for executing reverse transformation processing is associated with an execution instruction tag 572. Further, the reverse transformation information recording unit 200 can record an exclusion instruction pointer 560 for excluding decryption processing corresponding to the encryption processing that has been already executed upon the input data from the target for reverse transformation, while associating the exclusion instruction pointer 560 with the reverse transformation processing identification information 580.

In addition, in this example, the target data second-transformation unit 210 does not have to execute any transformation processing on the target data. In this case, the transformation processing identification information recording unit 220 transmits the transformed data 40 to the reverse transformation processing system 30 without adding any information to the transformation processing identification information record area in the input data. In response to this, the reverse transformation unit 320 executes reverse transformation processing corresponding to transformation processing which is the transformation processing designated by the transformation processing identification information acquired by the pointer acquisition unit 300, exclusive of the transformation processing designated by the exclusion instruction pointer 560 associated with the reverse transformation processing identification information 580. In the case of this example, only the transformation processing identification information 520 is recorded in the transformation processing identification information record area 500, with no other transformation processing identification information recorded therein. At the same time, the transformation processing identification information 520 is excluded from the target for reverse transformation by the exclusion instruction pointer 560. Accordingly, the reverse transformation unit 320 does not need to execute any reverse transformation processing.

In this case, when transformation processing identification information cannot be extracted by using the extraction program 544 in the extraction instruction information 540, the reverse transformation unit 320 inputs information for identifying null-transformation, in which data to be transformed is outputted as transformed data with no addition of alteration, to the reverse transformation program 574 while associating the information with the target data. FIG. 6 shows an example of the information for identifying null-transformation, created by the reverse transformation unit 320. Thereafter, using the reverse transformation program 574, the reverse transformation unit 320 outputs the target data as it is and then executes processing of verifying the digital signature for the target data.

FIG. 7 shows a third example of the transformed data 40. The transformed data 40 includes a transformation processing identification information record area 600 and a data record area 610. Using this example, a description will be given of a third example of the processing of creating the transformed data 40 by the transformation processing system 20. First in the first transformation device 22, upon receiving input data from a user, the reverse transformation information recording unit 200 creates a target data pointer for indicating the position of the data record area in the transformed data 40 and a transformation processing identification information pointer for indicating the position of the transformation processing identification information record area, prior to processing of encrypting the target data in the input data. The reverse transformation information recording unit 200 then further creates reverse transformation processing identification information for identifying reverse transformation processing for executing reverse transformation corresponding to transformation processing to be further executed upon the target data after encryption. The reverse transformation information recording unit 200 records these created pointers and information in, for example, a temporary storage area for temporarily storing information.

The target data first-transformation unit 205 then encrypts the target data in the input data, and creates an area for storing information to be associated with this encryption, on the 21st to 32nd lines in the transformed data 40. The identifier of this encryption processing is ed1 (on the 21st line). The target data first-transformation unit 205 then records the pointers and information, recorded in the temporary storage area by the reverse transformation information recording unit 200, in the area for storing information to be associated with the encryption in the transformation processing identification information record area 400.

Through the above processing, the reverse transformation information recording unit 200 can resultantly record a transformation processing identification information pointer 630 for indicating the start position of the transformation processing identification information record area 600 in the transformed data 40, in the transformation processing identification information record area 600 while associating the transformation processing identification information pointer 630 with a reference tag 632 for indicating the referent of a program. In addition, the reverse transformation information recording unit 200 can record a target data pointer 650 for indicating the data record area 610 in the transformed data 40, in the transformation processing identification information record area 600 while associating the target data pointer 650 with a reference tag 652.

Moreover, the reverse transformation information recording unit 200 can record extraction instruction information 640 and reverse transformation instruction information 660 as reverse transformation processing identification information 670. The extraction instruction information 640 indicates an instruction to extract the transformation processing identification information from the transformation identification information record area 600 designated by the transformation processing identification information pointer 630, and to output the transformation processing identification information in association with the target data designated by the target data pointer 650. The reverse transformation instruction information 660 indicates information for instructing the execution of reverse transformation processing on the outputted target data, the reverse transformation processing corresponding to the transformation processing designated by the transformation processing identification information outputted in association with the target data.

More specifically, the extraction instruction information 640 includes an execution instruction tag 642 and information, associated with the execution instruction tag 642, for indicating an extraction program 644 for executing extraction processing. The reverse transformation instruction information 660 includes an execution instruction tag 662 and information, associated with the execution instruction tag 662, for indicating a reverse transformation program 664 for executing reverse transformation processing.

The first transformation device 22 transmits the transformed data thus created to the second transformation device 24. Next, the second transformation device 24 will be described.

In the second transformation device 24, the target data second-transformation unit 210 further encrypts the target data and records it on the 52nd line in the data record area 610. Here, the data record area 610 includes a target data ID 615 for allowing a program or the like to refer to the data record area 610. The transformation processing identification information recording unit 220 then adds transformation processing identification information 620 for identifying the encryption processing executed by the target data second-transformation unit 210, to the transformation processing identification information record area in the input data, and thus records the transformation processing identification information 620 in the transformation processing identification information record area 600 in the transformed data 40. The identifier of this encryption processing is ed2 (on the 35th line). Here, the transformation processing identification information 620 includes information about a program for decrypting the target data, an encryption key or the like, and a target data pointer 625 for indicating the position where the target data is stored.

A description will be given of processing of decrypting the encrypted target data in this example. First, the reverse transformation unit 320 selects the transformation processing identification information record area 600 designated by the transformation processing identification information pointer 630, and inputs it to the extraction program 644. The reverse transformation unit 320 then executes the extraction program 644 and thereby extracts the transformation processing identification information 620. The reverse transformation unit 320 inputs the extracted transformation processing identification information 620 to the reverse transformation program 664, in association with the target data recorded in the data record area 610.

Upon doing this, the reverse transformation unit 320 executes the reverse transformation program 664 and thereby decrypts the inputted target data by decryption processing corresponding to the encryption processing identified by the transformation processing identification information 620. Thus, the reverse transformation unit 320 can execute the decryption processing corresponding to the encryption processing executed by the target data second-transformation unit 210. The reverse transformation unit 320 then further decrypts the decrypted target data by decryption processing corresponding to the encryption processing with the identifier ed1, and outputs the target data to a user.

As described above, even when the target date which has been once encrypted is encrypted once more, decryption can be properly executed, first starting with the encryption which was last executed.

FIG. 8 shows a forth example of the transformed data 40. The transformed data 40 includes a transformation processing identification information record area 700 and a data record area 710. Using this example, a detailed description will be given of a forth example of the processing of creating the transformed data 40 by the transformation processing system 20. First in the first transformation device 22, upon receiving input data from a user, the reverse transformation information recording unit 200 creates a target data pointer for indicating the position of the data record area in the transformed data 40 and a transformation processing identification information pointer for indicating the position of the transformation processing identification information record area, prior to processing of creating a digital signature for the input data. The reverse transformation information recording unit 200 then further creates reverse transformation processing identification information for identifying reverse transformation processing for executing reverse transformation corresponding to transformation processing to be further executed upon the target data after the creation of the digital signature. The reverse transformation information recording unit 200 records these created pointers and information in, for example, a temporary storage area for temporarily storing information.

The target data first-transformation unit 205 creates a digital signature based on the target data in the input data and on the pointers and information created by the reverse transformation information recording unit 200. The target data first-transformation unit 205 then creates an area for storing information associated with the digital signature, on the 20th to 31st lines in the transformed data 40. The target data first-transformation unit 205 then records the pointers and information, recorded in the temporary storage area by the reverse transformation information recording unit 200, in the area for storing information associated with the digital signature in the transformation processing identification information record area 400.

Through the above processing, the reverse transformation information recording unit 200 can resultantly record a target data pointer 730 for indicating the data record area 710 in the transformed data 40, in the transformation processing identification information record area 700 while associating the target data pointer 730 with a reference tag 732. Moreover, the reverse transformation information recording unit 200 can record a transformation processing identification information pointer 750 for indicating the start position of the transformation processing identification information record area 700 in the transformed data 40, in the transformation processing identification information record area 700 while associating the transformation processing identification information pointer 750 with a reference tag 752.

Furthermore, the reverse transformation information recording unit 200 can record reverse transformation processing identification information 740 in the transformation processing identification information record area 700, in association with the target data pointer 730 and the transformation processing identification information pointer 750. Here, the reverse transformation processing identification information 740 is an instruction to extract the transformation processing identification information from the transformation processing identification information record area 700 designated by the transformation processing identification information pointer 750, and to reversely transform the target data designated by the target data pointer 730, based on the extracted transformation processing identification information. Specifically, the reverse transformation processing identification information 740 is expressed as information in which an extraction reverse transformation program 744 for extracting transformation processing identification information and for reversely transforming the target data is associated with an execution instruction tag 742.

The first transformation device 22 transmits the transformed data thus created to the second transformation device 24. Next, the second transformation device 24 will be described.

In the second transformation device 24, the target data second-transformation unit 210 encrypts the target data and records it on the 51st line in the data record area 710. Here, the data record area 710 includes a target data ID 715 for allowing a program or the like to refer to the data record area 710. The transformation processing identification information recording unit 220 then adds transformation processing identification information 720 for identifying the encryption processing executed by the target data second-transformation unit 210 to the transformation processing identification information record area in the input data, and thus records the transformation processing identification information 720 in the transformation processing identification information record area 700 in the transformed data 40. For example, the transformation processing identification information 720 includes information about a program for decrypting the target data, an encryption key or the like, and a target data pointer 725 for indicating the position where the target data is stored.

A description will be given of processing of verifying the digital signature created by the target data first-transformation unit 205, with reference to FIGS. 9 and 10. The reverse transformation unit 320 selects the transformation processing identification information record area 700 designated by the transformation processing identification information pointer 750 and inputs it into the extraction reverse transformation program 744. FIG. 9 shows the transformation processing identification information record area 700 selected by the reverse transformation unit 320. The reverse transformation unit 320 then executes the extraction reverse transformation program 744 and thereby extracts the transformation processing identification information 720. FIG. 10 shows the transformation processing identification information 720 extracted by the reverse transformation unit 320. The reverse transformation unit 320 then executes the extraction reverse transformation program 744 and thereby reversely transforms the target data after transformed, designated by the target data pointer 730, into the target data in the input data, by reverse transformation processing corresponding to the transformation processing designated by the extracted transformation processing identification information 720. Subsequently, the reverse transformation unit 320 verifies the digital signature for the decrypted target data and then outputs the verification result and the target data to a user.

Here, if a plurality of pieces of transformation processing identification information are detected by using the extraction reverse transformation program 744, and if an exclusion pointer is recorded in association with reverse transformation processing identification information corresponding to transformation processing identification information in question, then reverse transformation is executed in the following processing procedure. First, the reverse transformation unit 320 selects any one of the plurality of pieces of reverse transformation processing identification information extracted. The reverse transformation unit 320 then refers to an exclusion instruction pointer associated with the selected reverse transformation processing identification information, and thereby detects all the other pieces of reverse transformation processing identification information exclusive of one designated by the exclusion instruction pointer.

Subsequently, the reverse transformation unit 320 further selects any one of the detected pieces of reverse transformation processing identification information. The reverse transformation unit 320 then refers to an exclusion instruction pointer associated with the selected reverse transformation processing identification information, and thereby detects all the other pieces of reverse transformation processing identification information exclusive of one designated by the exclusion instruction pointer. By sequentially repeating this processing, the reverse transformation unit 320 can resultantly select reverse transformation processing identification information excluding all the other reverse transformation processings recorded in the transformation processing identification information record area from the target for reverse transformation. The reverse transformation processing designated by this selected reverse transformation processing designation information is the reverse transformation processing to first execute. That is, the reverse transformation unit 320 first executes the reverse transformation processing designated by this selected reverse transformation processing identification information, and thereafter, sequentially selects reverse transformation processing to execute in a similar procedure.

Figure 11:
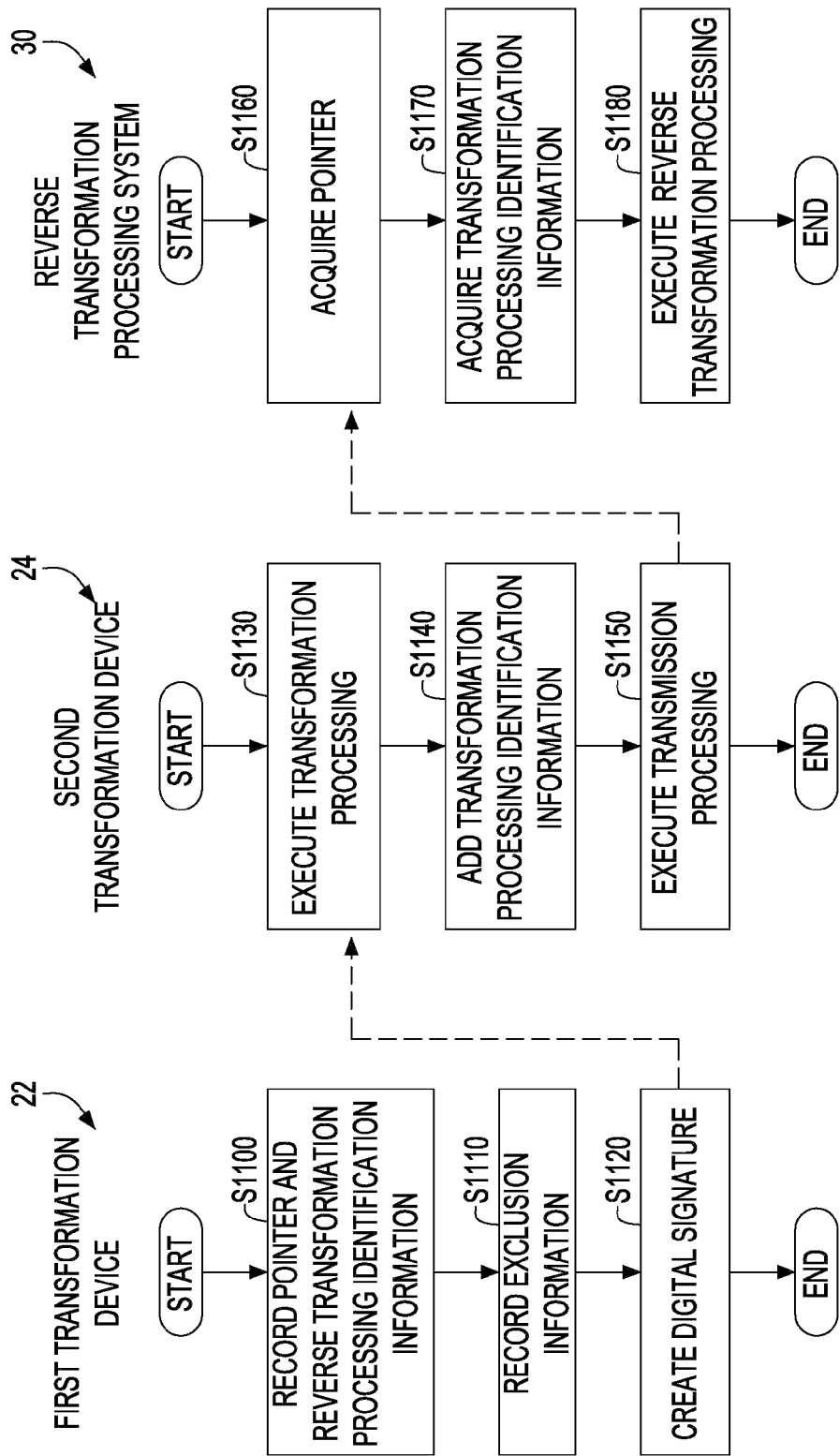
FIG. 11 shows an operation flow of transformation processing and reverse transformation processing in the information processing system 10.

FIG. 11 shows an operation flow of the transformation processing and reverse transformation processing in the information processing system 10. Upon receiving input data from a user, the reverse transformation information recording unit 200 creates a target data pointer for indicating the position of the data record area in the transformed data 40 and a transformation processing identification information pointer for indicating the position of the transformation processing identification information record area, prior to processing of creating a digital signature for the input data (S1100). The reverse transformation information recording unit 200 then further creates reverse transformation processing identification information for identifying reverse transformation processing for executing reverse transformation corresponding to transformation processing to be further executed upon target data after the creation of the digital signature. The reverse transformation information recording unit 200 records these created pointers and information in, for example, a temporary storage area for temporarily storing information.

The reverse transformation information recording unit 200 records an exclusion instruction pointer for excluding decryption processing corresponding to encryption processing that has been already executed upon the input data from the target for reverse transformation, while further associating the exclusion instruction pointer with the reverse transformation processing identification information (S1110). As the transformation processing, for example, the target data first-transformation unit 205 creates a digital signature for the target data in the input data and for the pointers and information created by the reverse transformation information recording unit 200 (S1120). The target data first-transformation unit 205 then records the pointers and information, recorded in the temporary storage area by the reverse transformation information recording unit 200, in an area for storing information associated with the digital signature in the transformation processing identification information record area. Thus, the reverse transformation information recording unit 200 can record the target data pointer, the transformation processing identification information pointer, the reverse transformation processing identification information and the exclusion instruction pointer, all in association with one another, in the transformation processing identification information record area.

Subsequently, the target data second-transformation unit 210 encrypts the target data in the input data and records it in the data record area in the transformed data 40 (S1130). The transformation processing identification information recording unit 220 then adds transformation processing identification information for identifying the encryption processing executed by the target data second-transformation unit 210 to the transformation processing identification information record area in the input data, and thus records the transformation processing identification information in the transformation processing identification information record area in the transformed data 40 (S1140). The transformation processing identification information recording unit 220 transmits the transformed data 40 thus created by the above processings to the reverse transformation processing system 30 via a network or the like (S1150).

The pointer acquisition unit 300 acquires the target data pointer and the transformation processing identification information pointer associated with the reverse transformation processing identification information (S1160). The transformation processing identification information acquisition unit 310 then acquires the transformation processing identification information from the transformation processing identification information record area designated by the transformation processing identification information pointer acquired by the pointer acquisition unit 300 (S1170).

The reverse transformation unit 320 then selects the transformation processing identification information acquired by the transformation processing identification information acquisition unit 310, as target transformation processing for which reverse transformation processing is to be executed (S1180). At this time, if an exclusion instruction pointer is associated with the reverse transformation processing identification information, the reverse transformation unit 320 excludes reverse transformation processing corresponding to the transformation processing identification information designated by the exclusion instruction pointer, from the target for reverse transformation processing.

The reverse transformation unit 320 reversely transforms the encrypted target data, which has been encrypted by encryption processing and is recorded in the data record area designated by the target data pointer acquired by the pointer acquisition unit 300, into the target data by the reverse transformation processing designated by the reverse transformation processing identification information, based on the selected transformation processing identification information. The reverse transformation unit 320 verifies the correctness of the digital signature, based on the target data after reversely transformed, and outputs the data after reversely transformed to a user, in association with the verification result.

Figure 12:
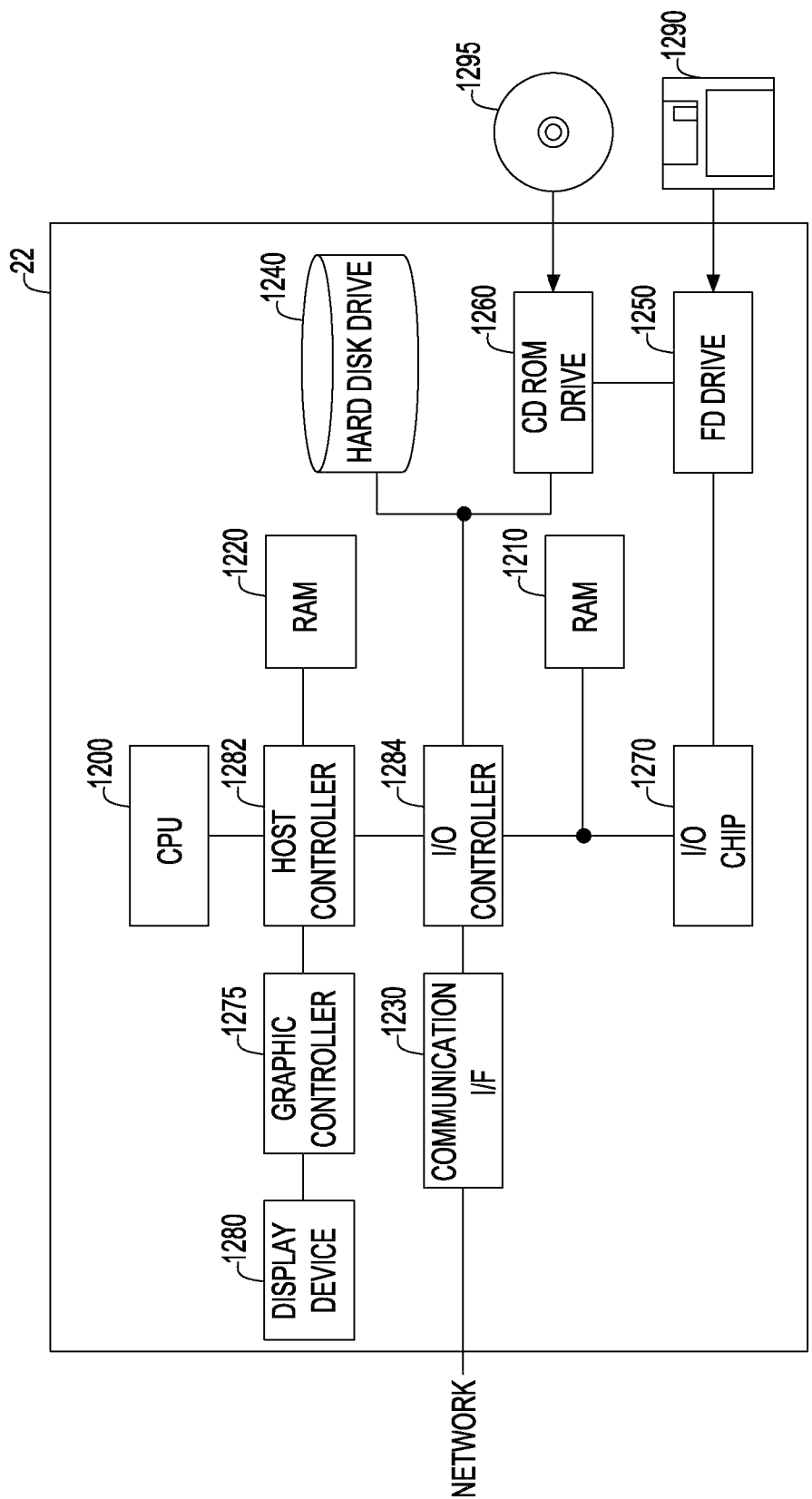
FIG. 12 shows an example of the hardware configuration of a computer functioning as a first transformation device 22.

FIG. 12 shows an example of the hardware configuration of a computer functioning as the first transformation device 22. The first transformation device 22 includes a CPU peripheral unit, an input/output unit and a legacy input/output unit. The CPU peripheral unit has a CPU 1200, a RAM 1220, a graphic controller 1275, and a display device 1280, which are interconnected by a host controller 1282. The input/output unit has a communication interface 1230, a hard disk drive 1240 and a CD-ROM drive 1260, which are connected to the host controller 1280 by an input/output controller 1284. The legacy input/output unit has a BIOS 1210, a flexible disk drive 1250 and an input/output chip 1270, which are connected to the input/output controller 1284.

The host controller 1282 connects the RAM 1220 to the CPU 1200 and the graphic controller 1275, each of which accesses the RAM 1220 at a high transfer rate. The CPU 1200 operates based on programs stored in the BIOS 1210 and the RAM 1220 and controls each part. The graphic controller 1275 acquires image data generated by the CPU 1200 or the like on a frame buffer provided in the RAM 1220 and allows the display device 1280 to display an image. Instead, the graphic controller 1275 may includes in itself a frame buffer to store image data generated by the CPU 1200 or the like.

The input/output controller 1284 connects the host controller 1282 to the communication interface 1230, the hard disk drive 1240 and the CD-ROM drive 1260, which are relatively-high-speed input/output devices. The communication interface 1230 communicates with an external device via a network. The hard disk drive 1240 stores programs and data to be used by the first transformation device 22. The CD-ROM drive 1260 reads a program or data from a CD-ROM 1295 and provides it to the input/output chip 1270 via the RAM 1220.

Moreover, the BIOS 1210 and the relatively-low-speed input/output devices, such as the flexible disk drive 1250 and the input/output chip 1270, are connected to the input/output controller 1284. The BIOS 1210 stores a boot program which the CPU 1200 executes when activating the first transformation device 22, a program depending on the hardware of the first transformation device 22, and the like. The flexible disk drive 1250 reads a program or data from a flexible disk 1290 and provides it to the input/output chip 1270 via the RAM 1220. The input/output chip 1270 connects the flexible disk 1290, as well as a variety of input/output devices via, for example, a parallel port, a serial port, a keyboard port, a mouse port, and the like.

A program to be provided to the first transformation device 22, for example, a transformation program according to the present invention, is provided by a user, stored on a recording medium such as the flexible disk 1290, the CD-ROM 1295 or an IC card. The transformation program is read out of the recording medium via the input/output chip 1270 and/or the input/output controller 1284, installed in the first transformation device 22 and executed therein.

The transformation program to be installed and executed in the first transformation device 22 includes a target data first-transformation module and a reverse transformation information recording module. Moreover, the transformation program to be provided to the first transformation device 22 may be transmitted to the second transformation device 24, and installed and executed therein. The transformation program to be executed in the second transformation device 24 includes a target data second-transformation module and a transformation processing identification information recording module. Further, the transformation program to be provided to the first transformation device 22 may be transmitted to the reverse transformation processing system 30, and installed and executed therein. The transformation program to be executed in the reverse transformation processing system 30 includes a pointer acquisition module, a transformation processing identification information acquisition module and a reverse transformation module. The operation which each module causes the first transformation device 22, the second transformation device 24 or the reverse transformation processing system 30 to perform, is the same as the operation of the corresponding member in the first transformation device 22, the second transformation device 24 or the reverse transformation processing system 30, which are described in conjunction with FIGS. 1 to 11. Therefore, the description thereof will be omitted.

Any of the above-mentioned programs and modules may be stored in an external storage medium. For the storage medium, apart from the flexible disk 1290 and the CD-ROM 1295, it is possible to use an optical recording medium such as a DVD or PD, a magneto-optic recording medium such as an MD, a tape medium, a semiconductor memory such as an IC card, or the like. In addition, the program may be provided to the first transformation device 22 via a network by using, as a recording medium, a storage device such as a hard disk or RAM provided on a server system connected to a private communication network or the Internet.

As described in this embodiment above, the transformation processing system 20 records an exclusion instruction pointer for instructing to exclude encryption that has been already executed upon data to be encrypted from the target for decryption. The reverse transformation processing system 30, prior to decryption, executes decryption processings corresponding to all the encryption processings other than the encryption excluded by the exclusion instruction pointer, and thereby properly decrypts data to be decrypted. Thus, in the information processing system 10, even when input data is transformed sequentially by a plurality of transformation devices, the transformed data 40 after subjected to those transformations can be reversely transformed in correct order by the reverse transformation processing system 30, and then a digital signature or the like can be properly verified.

Moreover, the transformation processing system 20 sets the transformation processing identification information pointer for indicating a span which the reverse transformation processing system 30 should search for encryption information so that the transformation processing identification information pointer indicates not only a data part which is a target for encryption but also a part in which encryption information might be recorded by later encryption processing. Thus, even when target data for encryption and encryption information are separately provided, the reverse transformation system 30 can properly detect all the encryption information concerning encrypted data to be decrypted. For example, this is particularly effective when the target data for encryption is binary data such as image data and is provided separately from XML data.

Although the present invention has been discussed above using the embodiment, the technical scope of the present invention is not limited to the scope described in the embodiment. It is apparent to those skilled in the art that it is possible to add various alterations or modifications to the above-described embodiment. It is apparent from description in the scope of claims that modes to which such alterations or modifications are added can be incorporated in the technical scope of the present invention.

According to the above-described embodiment, information processing systems, a transformation processing system, a reverse transformation processing system, a transformation method, a transformation program and a recording medium which are described in the following respective items, are realized.

(Item 1) An information processing system, including: (a) a transformation processing system which transforms input data to transformed data, wherein the input data includes a data record area for storing target data to be transformed, and a transformation processing identification information record area for storing transformation processing identification information for identifying transformation processing executed upon the target data, the transformation processing system having (i) a reverse transformation information recording unit which records into the transformed data a target data pointer, a transformation processing identification information pointer, and reverse transformation processing identification information in association with one another, the target data pointer indicating a position of the data record area in the transformed data, the transformation processing identification information pointer indicating a position of the transformation processing identification information record area, and the reverse transformation processing identification information identifying reverse transformation processing for executing reverse transformation corresponding to transformation processing to be executed upon the input data, (ii) a target data transformation unit which, as the transformation processing, transforms the target data in the input data and records the transformed target data in the data record area in the transformed data, and (iii) a transformation processing identification information recording unit which adds the transformation processing identification information for identifying the transformation processing executed by the target data transformation unit to the transformation processing identification information record area in the input data, and thus records the transformation processing identification information in the transformation processing identification information record area in the transformed data; (b) and a reverse transformation processing system which reversely transforms the transformed data to the input data, the reverse transformation processing system having (i) a pointer acquisition unit which acquires the target data pointer and the transformation processing identification information pointer, each associated with the reverse transformation processing identification information, (ii) a transformation processing identification information acquisition unit which acquires the transformation processing identification information from the transformation processing identification information record area designated by the transformation processing identification information pointer acquired by the pointer acquisition unit, and (iii) a reverse transformation unit which reversely transforms the transformed target data, which has been transformed through the transformation processing and recorded in the target data record area designated by the target data pointer acquired by the pointer acquisition unit, into the target data through reverse transformation processing designated by the reverse transformation processing identification information, based on the transformation processing identification information acquired by the transformation processing identification information acquisition unit.

(Item 2) The information processing system according to Item 1, wherein the reverse transformation information recording unit records an instruction to exclude reverse transformation processing corresponding to transformation processing which has been already executed upon the input data from a target for reverse transformation, while associating the instruction with the reverse transformation processing identification information, and wherein the reverse transformation unit executes reverse transformation corresponding to transformation processing, which is transformation processing designated by the transformation processing identification information acquired by the transformation processing identification information acquisition unit exclusive of transformation processing associated with the reverse transformation processing identification information, and thus reversely transforms the target data to the input data.

(Item 3) The information processing system according to Item 1, wherein the reverse information recording unit records extraction instruction information and reverse transformation instruction information as the reverse transformation processing identification information, the extraction instruction information indicating an instruction to extract transformation processing identification information from the transformation processing identification information record area designated by the transformation processing identification information pointer and to output the extracted information in association with the target data designated by the target data pointer, and the reverse transformation instruction information instructing execution of reverse transformation processing on the outputted target data, the reverse transformation processing corresponding to transformation processing designated by the transformation processing identification information outputted in association with the target data, and wherein the reverse transformation unit extracts transformation processing identification information from the transformation processing identification information record area, based on the extraction instruction information, inputs the extracted transformation processing identification information, in association with the target data, into a reverse transformation program designated by the transformation instruction information, and thereby reversely transforms the target data.

(Item 4) The information processing system according to Item 3, wherein, when transformation processing identification information cannot be extracted based on the extraction instruction information, the reverse transformation unit inputs information for identifying null-transformation, in association with the target data, into the reverse transformation program, the null-transformation outputting target data to be transformed as data after transformed without adding any alteration to the target data.

(Item 5) The information processing system according to Item 3, wherein, when a plurality of pieces of transformation processing identification information are extracted based on the extraction instruction information, the reverse transformation unit selects transformation processing identification information for identifying transformation processing which was first executed among the plurality of pieces of transformation processing identification information, and inputs the selected information into the reverse transformation program.

(Item 6) The information processing system according to Item 3, wherein data in the transformation processing identification information record area is tagged data, in which information is associated with tag information for instructing how to use the information, and wherein, in the transformation processing identification information record area in the transformed data, the reverse transformation information recording unit records, as the extraction instruction information, information for indicating an extraction program for executing extraction processing in association with an execution instruction tag for instructing to execute a program, records the transformation processing identification information pointer and the target data pointer in association with a reference tag for indicating a referent of the extraction program, and records, as the reverse transformation instruction information, information for indicating a reverse transformation program for executing reverse transformation processing in association with another execution instruction tag.

(Item 7) The information processing system according to Item 1, wherein the reverse transformation information recording unit records, as the reverse transformation processing identification information, an instruction to extract transformation processing identification information from the transformation processing identification information record area designated by the transformation processing identification information pointer, and to reversely transform the target data designated by the target data pointer, based on the extracted transformation processing identification information, and wherein the reverse transformation unit extracts the transformation processing identification information based on the reverse transformation processing identification information, and, based on the extracted transformation processing identification information, reversely transforms the target data after transformed, designated by the target data pointer, into the target data through reverse transformation processing designated by the reverse transformation processing identification information.

(Item 8) The information processing system according to Item 7, wherein the reverse transformation information recording unit records, as the reverse transformation processing identification information, an exclusion instruction to exclude reverse transformation processing corresponding to transformation processing which has been already executed upon the input data, from a target for reverse transformation, and wherein, when a plurality of pieces of transformation processing identification information are extracted, the reverse transformation unit sequentially refers to the exclusion instruction from any of pieces of reverse transformation processing identification information corresponding to the respective pieces of transformation processing identification information, thereby selects reverse transformation processing identification information which excludes all the other reverse transformation processings from a target for reverse transformation, and reversely transforms the target data after transformed through reverse transformation processing designated by the selected reverse transformation processing identification information.

(Item 9) The information processing system according to item 7, wherein data in the transformation processing identification information record area is tagged data, in which information is associated with tag information for instructing how to use the information, and wherein, in the transformation processing identification information record area in the transformed data, the reverse transformation information recording unit records, as the reverse transformation processing identification information, information for indicating an extraction reverse transformation program for extracting transformation processing identification information and reversely transforming target data, in association with an execution instruction tag for instructing execution of a program, and records the target data pointer and the transformation processing identification information pointer in association with a reference tag for indicating a referent of the extraction reverse transformation program.

(Item 10) The information processing system according to Item 1, wherein, as the transformation processing, the target data transformation unit encrypts target data in the input data and records the encrypted target data in the data record area in the transformed data, and wherein the reverse transformation unit decrypts the target data encrypted by the transformation processing and thereby reversely transforms the encrypted target data into the target data.

(Item 11) A transformation processing system which transforms input data to transformed data, wherein the input data includes a data record area for storing target data to be transformed, and a transformation processing identification information record area for storing transformation processing identification information for identifying transformation processing executed upon the target data, the transformation processing system including: a reverse transformation information recording unit which records into the transformed data a target data pointer, a transformation processing identification information pointer, and reverse transformation processing identification information in association with one another, the target data pointer indicating a position of the data record area in the transformed data, the transformation processing identification information pointer indicating a position of the transformation processing identification information record area, and the reverse transformation processing identification information identifying reverse transformation processing for executing reverse transformation corresponding to transformation processing to be executed upon the input data; a target data transformation unit which, as the transformation processing, transforms the target data in the input data and records the transformed target data into the data record area in the transformed data; and a transformation processing identification information recording unit which adds the transformation processing identification information for identifying the transformation processing executed by the target data transformation unit to the transformation processing identification information record area in the input data, and thus records the transformation processing identification information in the transformation processing identification information record area in the transformed data.

(Item 12) A reverse transformation processing system which reversely transforms transformed data to input data, the transformed data having been transformed from the input data by a transformation processing system, wherein the input data includes a data record area for storing target data to be transformed, and a transformation processing identification information record area for storing transformation processing identification information for identifying transformation processing executed upon the target data, and wherein the transformation processing system has (i) a reverse transformation information recording unit which records into the transformed data a target data pointer, a transformation processing identification information pointer, and reverse transformation processing identification information in association with one another, the target data pointer indicating a position of the data record area in the transformed data, the transformation processing identification information pointer indicating a position of the transformation processing identification information record area, and the reverse transformation processing identification information identifying reverse transformation processing for executing reverse transformation corresponding to transformation processing to be executed upon the input data, (ii) a target data transformation unit which, as the transformation processing, transforms the target data in the input data and records the transformed target data into the data record area in the transformed data, and (iii) a transformation processing identification information recording unit which adds the transformation processing identification information for identifying the transformation processing executed by the target data transformation unit to the transformation processing identification information record area in the input data, and thus records the transformation processing identification information in the transformation processing identification information record area in the transformed data, the reverse transformation processing system including: a pointer acquisition unit which acquires the target data pointer and the transformation processing identification information pointer, each associated with the reverse transformation processing identification information; a transformation processing identification information acquisition unit which acquires the transformation processing identification information from the transformation processing identification information record area designated by the transformation processing identification information pointer acquired by the pointer acquisition unit; and a reverse transformation unit which reversely transforms the transformed target data, which has been transformed through the transformation processing and recorded in the target data record area designated by the target data pointer acquired by the pointer acquisition unit, into the target data through reverse transformation processing designated by the reverse transformation processing identification information, based on the transformation processing identification information acquired by the transformation processing identification information acquisition unit.

(Item 13) A transformation method for executing transformation processing by using a transformation processing system, which transforms input data to transformed data, and a reverse transformation processing system, which reversely transforms the transformed data to the input data, wherein the input data includes a data record area for storing target data to be transformed, and a transformation processing identification information record area for storing transformation processing identification information for identifying transformation processing executed upon the target data, the method including: by using the transformation processing system, (i) a reverse transformation information recording step of recording into the transformed data a target data pointer, a transformation processing identification information pointer, and reverse transformation processing identification information in association with one another, the target data pointer indicating a position of the data record area in the transformed data, the transformation processing identification information pointer indicating a position of the transformation processing identification information record area, and the reverse transformation processing identification information identifying reverse transformation processing for executing reverse transformation corresponding to transformation processing to be executed upon the input data; (ii) a target data transformation step of, as the transformation processing, transforming the target data in the input data and records the transformed target data in the data record area in the transformed data; (iii) a transformation processing identification information recording step of adding the transformation processing identification information for identifying the transformation processing executed in the target data transformation step to the transformation processing identification information record area in the input data, and thus recording the transformation processing identification information in the transformation processing identification information record area in the transformed data; by using the reverse transformation processing system, (i) a pointer acquisition step of acquiring the target data pointer and the transformation processing identification information pointer, each associated with the reverse transformation processing identification information; (ii) a transformation processing identification information acquisition step of acquiring the transformation processing identification information from the transformation processing identification information record area designated by the transformation processing identification information pointer acquired in the pointer acquisition step; and (iii) a reverse transformation step of reversely transforming the transformed target data, which has been transformed through the transformation processing and recorded in the target data record area designated by the target data pointer acquired in the pointer acquisition step, into the target data through reverse transformation processing designated by the reverse transformation processing identification information, based on the transformation processing identification information acquired in the transformation processing identification information acquisition step.

(Item 14) A transformation program for controlling a transformation processing system, which transforms input data to transformed data, and a reverse transformation processing system, which reversely transforms the transformed data to the input data, wherein the input data includes a data record area for storing target data to be transformed, and a transformation processing identification information record area for storing transformation processing identification information for identifying transformation processing executed upon the target data, the program causing the transformation processing system to function as: (i) a reverse transformation information recording unit which records into the transformed data a target data pointer, a transformation processing identification information pointer, and reverse transformation processing identification information in association with one another, the target data pointer indicating a position of the data record area in the transformed data, the transformation processing identification information pointer indicating a position of the transformation processing identification information record area, and the reverse transformation processing identification information identifying reverse transformation processing for executing reverse transformation corresponding to transformation processing to be executed upon the input data; (ii) a target data transformation unit which, as the transformation processing, transforms the target data in the input data and records the transformed target data in the data record area in the transformed data; and (iii) a transformation processing identification information recording unit which adds the transformation processing identification information for identifying the transformation processing executed by the target data transformation unit to the transformation processing identification information record area in the input data, and thus records the transformation processing identification information in the transformation processing identification information record area in the transformed data, and the program causing the reverse transformation processing system to function as: (i) a pointer acquisition unit which acquires the target data pointer and the transformation processing identification information pointer, each associated with the reverse transformation processing identification information; (ii) a transformation processing identification information acquisition unit which acquires the transformation processing identification information from the transformation processing identification information record area designated by the transformation processing identification information pointer acquired by the pointer acquisition unit; and (iii) a reverse transformation unit which reversely transforms the transformed target data, which has been transformed through the transformation processing and recorded in the target data record area designated by the target data pointer acquired by the pointer acquisition unit, into the target data through reverse transformation processing designated by the reverse transformation processing identification information, based on the transformation processing identification information acquired by the transformation processing identification information acquisition unit.

(Item 15) A recording medium storing the transformation program according to Item 14.

Although the preferred embodiment of the present invention has been described in detail, it should be understood that various changes, substitutions and alternations can be made therein without departing from spirit and scope of the inventions as defined by the appended claims.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. An information processing system, comprising:
   (a) a transformation processing system which transforms input data to transformed data, wherein the input data includes a data record area for storing target data to be transformed, and a transformation processing identification information record area for storing transformation processing identification information for identifying transformation processing executed upon the target data, the transformation processing system having:
      (i) a reverse transformation information recording unit which records into the transformed data a target data pointer, a transformation processing identification information pointer, and reverse transformation processing identification information in association with one another, the target data pointer indicating a position of the data record area in the transformed data, the transformation processing identification information pointer indicating a position of the transformation processing identification information record area, and the reverse transformation processing identification information identifying reverse transformation processing for executing reverse transformation corresponding to transformation processing to be executed upon the input data, wherein the target data pointer verifies authenticity of the target data by verifying that the target data is in a proper area by referring to the target data pointer,
      (ii) a target data transformation unit which, as the transformation processing, transforms the target data in the input data and records the transformed target data in the data record area in the transformed data, and
      (iii) a transformation processing identification information recording unit which adds the transformation processing identification information for identifying the transformation processing executed by the target data transformation unit to the transformation processing identification information record area in the input data, and thus records the transformation processing identification information in the transformation processing identification information record area in the transformed data; and
   (b) a reverse transformation processing system which reversely transforms the transformed data to the input data, the reverse transformation processing system having:
      (i) a pointer acquisition unit which acquires the target data painter and the transformation processing identification information pointer, each associated with the reverse transformation processing identification information,
      (ii) a transformation processing identification information acquisition unit which acquires the transformation processing identification information from the transformation processing identification information record area designated by the transformation processing identification information pointer acquired by the painter acquisition unit, and
      (iii) a reverse transformation unit which reversely transforms the transformed target data, which has been transformed through the transformation processing and recorded in the target data record area designated by the target data pointer acquired by the pointer acquisition unit, into the target data through reverse transformation processing designated by the reverse transformation processing identification information, based on the transformation processing identification information acquired by the transformation processing identification information acquisition unit,
   wherein the reverse transformation information recording unit records an instruction to exclude reverse transformation processing corresponding to transformation processing which has been already executed upon the input data from a target for reverse transformation, while associating the instruction with the reverse transformation processing identification information, and
   wherein the reverse transformation unit executes reverse transformation corresponding to transformation processing, which is transformation processing designated by the transformation processing identification information acquired by the transformation processing identification information acquisition unit exclusive of transformation processing associated with the reverse transformation processing identification information, and thus reversely transforms the target data to the input data,
   wherein the target data transformation unit creates a digital signature for the target data, the target data pointer, the transformation processing identification information pointer, and the reverse transformation processing identification information,
   wherein the reverse transformation unit verifies correctness of the digital signature based upon reversely transformed target data, and wherein the reverse transformation unit outputs a result of the verification of the digital signature to a user.

2. The information processing system according to claim 1, wherein the reverse transformation information recording unit records extraction instruction information and reverse transformation instruction information as the reverse transformation processing identification information, the extraction instruction information indicating an instruction to extract processing identification information from the transformation processing identification information record area designated by the transformation processing identification information pointer and to output the extracted information in association with the target data designated by the target data pointer, and the reverse transformation instruction information instructing execution of reverse transformation processing on the outputted target data, the reverse transformation processing corresponding to transformation processing designated by the transformation processing identification information outputted in association with the target data, wherein the reverse transformation unit extracts transformation processing identification information from the transformation processing identification information record area, based on the extraction instruction information, inputs the extracted transformation processing identification information, in association with the target data, into a first reverse transformation program designated by the transformation instruction information, and thereby reversely transforms the target data, and wherein the first reverse transformation program is recursively called in sequence in the order of the reverse transformation processing.

3. The information processing system according to claim 2, wherein, when transformation processing identification information cannot be extracted based on the extraction instruction information, the reverse transformation unit inputs information for identifying null-transformation, in association with the target data, into the first reverse transformation program, the null-transformation outputting target data to be transformed as data after the target data is transformed without adding any alteration to the target data.

4. The information processing system according to claim 2, wherein, when a plurality of pieces of transformation processing identification information are extracted based on the extraction instruction information, the reverse transformation unit selects transformation processing identification information for identifying transformation processing which was first executed among the plurality of pieces of transformation processing identification information, and inputs the selected transformation processing identification information into the first reverse transformation program.

5. The information processing system according to claim 2, wherein data in the transformation processing identification information record area is tagged data, in which information is associated with tag information for instructing how to use the information, and wherein, in the transformation processing identification information record area in the transformed data, the reverse transformation information recording unit records, as the extraction instruction information, information for indicating an extraction program for executing extraction processing in association with an execution instruction tag for instructing to execute a program, records the transformation processing identification information pointer and the target data pointer in association with a reference tag for indicating a referent of the extraction program, and records, as the reverse transformation instruction information, information for indicating a second reverse transformation program for executing reverse transformation processing in association with another execution instruction tag.

6. The information processing system according to claim 1, wherein the reverse transformation information recording unit records, as the reverse transformation processing identification information, an instruction to extract transformation processing identification information from the transformation processing identification information record area designated by the transformation processing identification information pointer, and to reversely transform the target data designated by the target data pointer, based on the extracted transformation processing identification information, and wherein the reverse transformation unit extracts the transformation processing identification information based on the reverse transformation processing identification information, and, based on the extracted transformation processing identification information, reversely transforms the target data after the target data is transformed, designated by the target data pointer, into the target data through reverse transformation processing designated by the reverse transformation processing identification information.

7. The information processing system according to claim 6, wherein the reverse transformation information recording unit records, as the reverse transformation processing identification information, an exclusion instruction to exclude reverse transformation processing corresponding to transformation processing which has been already executed upon the input data, from a target for reverse transformation, and wherein, when a plurality of pieces of transformation processing identification information are extracted, the reverse transformation unit sequentially refers to the exclusion instruction from any of pieces of reverse transformation processing identification information corresponding to the respective pieces of transformation processing identification information, thereby selects reverse transformation processing identification information which excludes all the other reverse transformation processing from a target for reverse transformation, and reversely transforms the target data after the target data is transformed through reverse transformation processing designated by the selected reverse transformation processing identification information.

8. The information processing system according to claim 6, wherein data in the transformation processing identification information record area is tagged data, in which information is associated with tag information for instructing how to use the information, and wherein, in the transformation processing identification information record area in the transformed data, the reverse transformation information recording unit records, as the reverse transformation processing identification information, information for indicating an extraction reverse transformation program for extracting transformation processing identification information and reversely transforming target data, in association with an execution instruction tag for instructing execution of the extraction reverse transformation program, and records the target data pointer and the transformation processing identification information pointer in association with a reference tag for indicating a referent of the extraction reverse transformation program.

9. The information processing system according to claim 1, wherein, as the transformation processing, the target data transformation unit encrypts target data in the input data and records the encrypted target data in the data record area in the transformed data, and wherein the reverse transformation unit decrypts the target data encrypted by the transformation processing and thereby reversely transforms the encrypted target data into the target data.

10. A transformation processing system which transforms input data to transformed data, wherein the input data includes a data record area for storing target data to be transformed, and a transformation processing identification information record area for storing transformation processing identification information for identifying transformation processing executed upon the target data, the transformation processing system comprising:

a reverse transformation information recording unit which records into the transformed data a target data pointer, a transformation processing identification information pointer, and reverse transformation processing identification information in association with one another, the target data pointer indicating a position of the data record area in the transformed data, the transformation processing identification information pointer indicating a position of the transformation processing identification information record area, and the reverse transformation processing identification information identifying reverse transformation processing for executing reverse transformation corresponding to transformation processing to be executed upon the input data wherein the target data pointer verifies authenticity of the target data by verifying that the target data is in a proper area by referring to the target data pointer;

a target data transformation unit which, as the transformation processing, transforms the target data in the input data and records the transformed target data into the data record area in the transformed data;

a transformation processing identification information recording unit which adds the transformation processing identification information for identifying the transformation processing executed by the target data transformation unit to the transformation processing identification information record area in the input data, and thus records the transformation processing identification information in the transformation processing identification information record area in the transformed data, wherein the reverse transformation information recording unit records an instruction to exclude reverse transformation processing corresponding to transformation processing which has been already executed upon the input data from a target for reverse transformation, while associating the instruction with the reverse transformation processing identification information, and wherein the target data transformation unit creates a digital signature for the target data, the target data pointer; the transformation processing identification information pointer; and the reverse transformation processing identification information.

11. A reverse transformation processing system which reversely transforms transformed data to input data, the transformed data having been transformed from the input data by a transformation processing system, wherein the input data includes a data record area for storing target data to be transformed, and a transformation processing identification information record area for storing transformation processing identification information for identifying transformation processing executed upon the target data, and wherein the transformation processing system has:

(i) a reverse transformation information recording unit which records into the transformed data a target data pointer, a transformation processing identification information pointer, and reverse transformation processing identification information in association with one another, the target data pointer indicating a position of the data record area in the transformed data, the transformation processing identification information pointer indicating a position of the transformation processing identification information record area, and the reverse transformation processing identification information identifying reverse transformation processing for executing reverse transformation corresponding to transformation processing to be executed upon the input data, (ii) a target data transformation unit which, as the transformation processing, transforms the target data in the input data and records the transformed target data into the data record area in the transformed data, and (iii) a transformation processing identification information recording unit which adds the transformation processing identification information for identifying the transformation processing executed by the target data transformation unit to the transformation processing identification information record area in the input data, and thus records the transformation processing identification information in the transformation processing identification information record area in the transformed data, the reverse transformation processing system comprising:

a pointer acquisition unit which acquires the target data pointer and the transformation processing identification information pointer each associated with the reverse transformation processing identification information;

a transformation processing identification information acquisition unit which acquires the transformation processing identification information from the transformation processing identification information record area designated by the transformation processing identification information pointer acquired by the pointer acquisition unit; and a reverse transformation which reversely transforms the transformed target data, which has been transformed through the transformation processing and recorded in the target data record area designated by the target data pointer acquired by the pointer acquisition unit, into the target data through reverse transformation processing designated by the reverse transformation processing identification information, based on the transformation processing identification information acquired by the transformation processing identification information acquisition unit, wherein the reverse transformation unit executes reverse transformation corresponding to transformation processing, which is transformation processing designated by the transformation processing identification information acquired by the transformation processing identification information acquisition unit exclusive of transformation processing associated with the reverse transformation processing identification information, and thus reversely transforms the target data to the input data, wherein the reverse transformation unit verifies correctness of the digital signature based upon reversely transformed target data, and wherein the reverse transformation unit outputs a result of the verification of the digital signature to a user.

12. A transformation method comprising:

executing transformation processing by using a transformation processing system, which transforms input data to transformed data, and a reverse transformation processing system, which reversely transforms the transformed data to the input data, wherein the input data includes a data record area for storing target data to be transformed, and a transformation processing identification information record area for storing transformation processing identification information for identifying transformation processing executed upon the target data, and the method comprising:

(a) by using the transformation processing system,
  (i) a reverse transformation information recording step of recording into the transformed data target data pointer, a transformation processing identification information pointer, and reverse transformation processing identification information in association with one another, the target data pointer indicating a position of the data record area in the transformed data, the transformation processing identification information pointer indicating a position of the transformation identification information processing record area, and the reverse transformation processing identification information identifying reverse transformation processing for executing reverse transformation corresponding to transformation processing to be executed upon the input data;
  (ii) a target data transformation step of, as the transformation processing, transforming the target data in the input data and records the transformed target data in the data record area in the transformed data;
  (iii) a transformation processing identification information recording step of adding the transformation processing identification information for identifying the transformation processing executed in the target data transformation step to the transformation processing identification information record area in the input data, and thus recording the transformation processing identification information in the transformation processing identification information record area in the transformed data;

(b) by using the reverse transformation processing system,
  (i) a pointer acquisition step of acquiring the target data pointer and the transformation processing identification information pointer, each associated with the reverse transformation processing identification information;
  (ii) a transformation processing identification information acquisition step of acquiring the transformation processing identification information from the transformation processing identification information record area designated by the transformation processing identification information pointer acquired in the pointer acquisition step; and
  (iii) a reverse transformation step of reversely transforming the transformed target data, which has been transformed through the transformation processing and recorded in the target data record area designated by the target data pointer acquired in the pointer acquisition step, into the target data through reverse transformation processing designated by the reverse transformation processing identification information, based on the transformation processing identification information acquired in the transformation processing identification information acquisition step, wherein the reverse transformation information recording step records an instruction to exclude reverse transformation processing corresponding to transformation processing which has been already executed upon the input data from a target for reverse transformation, while associating the instruction with the reverse transformation processing identification information, and wherein the reverse transformation step executes reverse transformation corresponding to transformation processing, which is transformation processing designated by the transformation processing identification information acquired by the transformation processing identification information acquisition step exclusive of transformation processing associated with the reverse transformation processing identification information, and thus reversely transforms the target data to the input data, wherein the target data transformation step creates a digital signature for the target data, the target data pointer, the transformation processing identification information pointer, and the reverse transformation processing identification information, wherein the reverse transformation step verifies correctness of the digital signature based upon reversely transformed target data, and wherein the reverse transformation step outputs a result of the verification of the digital signature to a user.

13. A transformation computer program product stored on a non-transitory computer storage medium comprising a computer program product for controlling a transformation processing system, which transforms input data to transformed data, a reverse transformation processing system, which reversely transforms the transformed data to the input data, wherein the input data includes a data record area for storing target data to be transformed, and a transformation processing identification information record area for storing transformation processing identification information for identifying transformation processing executed upon the target data, wherein: the computer program product causes the transformation processing system to function as:
  (i) a reverse transformation information recording unit which records by a computer processor into the transformed data a target data pointer, a transformation processing identification information pointer, and reverse transformation processing identification information in association with one another, the target data pointer indicating a position of the data record area in the transformed data, the transformation processing identification information pointer indicating a position of the transformation processing identification information record area, and the reverse transformation processing identification information identifying reverse transformation processing for executing reverse transformation corresponding to transformation processing to be executed upon the input data;
  (ii) a target data transformation unit which, as the transformation processing, transforms the target data in the input data and records the transformed target data in the data record area in the transformed data; and
  (iii) a transformation processing identification information recording unit which adds the transformation processing identification information for identifying the transformation processing executed by the target data transformation unit to the transformation processing identification information record area in the input data, and thus records the transformation processing identification information in the transformation processing identification information record area in the transformed data; and the computer program product causing the reverse transformation processing system to function as:

(i) a pointer acquisition unit which acquires the target data pointer and the transformation processing identification information pointer, each associated with the reverse transformation processing information;

(ii) a transformation processing identification information acquisition unit which acquires the transformation processing identification information from the transformation processing identification information record area designated by the transformation processing identification information pointer acquired by the pointer acquisition unit; and (iii) a reverse transformation unit which reversely transforms the transformed target data, which has been transformed through the transformation processing and recorded in the target data record area designated by the target data pointer acquired by the pointer acquisition unit, into the target data through reverse transformation processing designated by the reverse transformation processing identification information, based on the transformation processing identification information acquired by the transformation processing identification information acquisition unit, wherein the reverse transformation information recording unit records an instruction to exclude reverse transformation processing corresponding to transformation processing which has been already executed upon the input data from a target for reverse transformation, while associating the instruction with the reverse transformation processing identification information, and wherein the reverse transformation unit executes reverse transformation corresponding to transformation processing, which is transformation processing designated by the transformation processing identification information acquired by the transformation processing identification information acquisition unit exclusive of transformation processing associated with the reverse transformation processing identification information, and thus reversely transforms the target data to the input data, wherein the target data transformation unit creates a digital signature for the target data, the target data pointer, the transformation processing identification information pointer, and the reverse transformation processing identification information, wherein the reverse transformation unit verifies correctness of the digital signature based upon reversely transformed target data, and wherein the reverse transformation unit outputs a result of the verification of the digital signature to a user.

14. A computer program product stored on a non-transitory computer usable storage medium having computer readable program code embodied therein for causing a transformation processing system, the computer readable program code in said computer program product comprising computer readable program code for causing a computer to effect the functions of claim 10.

15. A computer program product stored on a non-transitory computer usable storage medium having computer readable program code embodied therein for causing a reverse transformation processing system, the computer readable program code in said computer program product comprising computer readable program code for causing a computer to effect the functions of claim 11.

* * * * *